US011675351B1

(12) United States Patent
Fitzhugh et al.

(10) Patent No.: US 11,675,351 B1
(45) Date of Patent: Jun. 13, 2023

(54) ELECTROSTATIC DISSIPATION SYSTEM FOR AN AUTONOMOUS MOBILE DEVICE

(71) Applicant: AMAZON TECHNOLOGIES, INC., Seattle, WA (US)

(72) Inventors: Christopher Wells Fitzhugh, San Jose, CA (US); Li Huang, San Jose, CA (US); Catherine May Farmer, San Francisco, CA (US); Duc Hongle Ngo, Hayward, CA (US); Eric Foxlin, Belmont, CA (US); Gregory Turner Witmer, Los Gatos, CA (US); Babak Hashemizadeh, Fremont, CA (US); Marcel Colman Eric Stieber, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 141 days.

(21) Appl. No.: 17/301,739

(22) Filed: Apr. 13, 2021

(51) Int. Cl.
  *G05D 1/00* (2006.01)
  *G05D 1/02* (2020.01)
  *B60R 16/06* (2006.01)

(52) U.S. Cl.
  CPC ........... *G05D 1/0088* (2013.01); *B60R 16/06* (2013.01); *G05D 1/0253* (2013.01); *G05D 1/0272* (2013.01)

(58) Field of Classification Search
  CPC .. G05D 1/0088; G05D 1/0253; G05D 1/0272; H05K 9/0067; B60R 16/06
  See application file for complete search history.

(56) References Cited

U.S. PATENT DOCUMENTS

| 7,401,796 | B1* | 7/2008 | Greco | A47B 21/00 |
| | | | | 280/47.35 |
| 10,881,040 | B1* | 12/2020 | Herreid | B62B 5/00 |
| 2012/0047676 | A1* | 3/2012 | Jung | A47L 9/2857 |
| | | | | 15/4 |
| 2019/0125154 | A1* | 5/2019 | Fay | A47L 9/2826 |
| 2019/0202301 | A1* | 7/2019 | O'Brien | H05F 3/04 |

* cited by examiner

*Primary Examiner* — Michael J Zanelli
(74) *Attorney, Agent, or Firm* — Lindauer Law, PLLC

(57) ABSTRACT

An autonomous mobile device (AMD) builds up electrostatic charges from moving and generates heat from the operation of internal components. In addition to possible user discomfort, electrostatic discharges may damage sensors and electronics. Electrostatic charges are dissipated from the AMD using an electrostatic dissipation structure and conductive wheels. A conductive path between a chassis ground, the electrostatic dissipation structure, and the conductive wheels improves the dissipation of electrostatic charges. Electrostatic charges are also dissipated from components by mounting the components using conductive materials. Sensors may be affixed to a support structure that is affected by thermal expansion. Thermal expansion may distort precise positioning of sensors, reducing accuracy of sensor data. An elastomeric foam may be used to mount sensors to a support structure, allowing for thermal expansion without distorting the positioning of the sensors.

20 Claims, 8 Drawing Sheets

ELECTROSTATIC DISSIPATION SYSTEM FOR AN AUTONOMOUS MOBILE DEVICE

BACKGROUND

Every day users face a variety of personal and professional tasks. These tasks may include helping in the care of others such as children or the elderly, taking care of a home, or staying in contact with others. Devices that assist in these tasks may help the user perform the tasks better or may free up the user to do other things.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
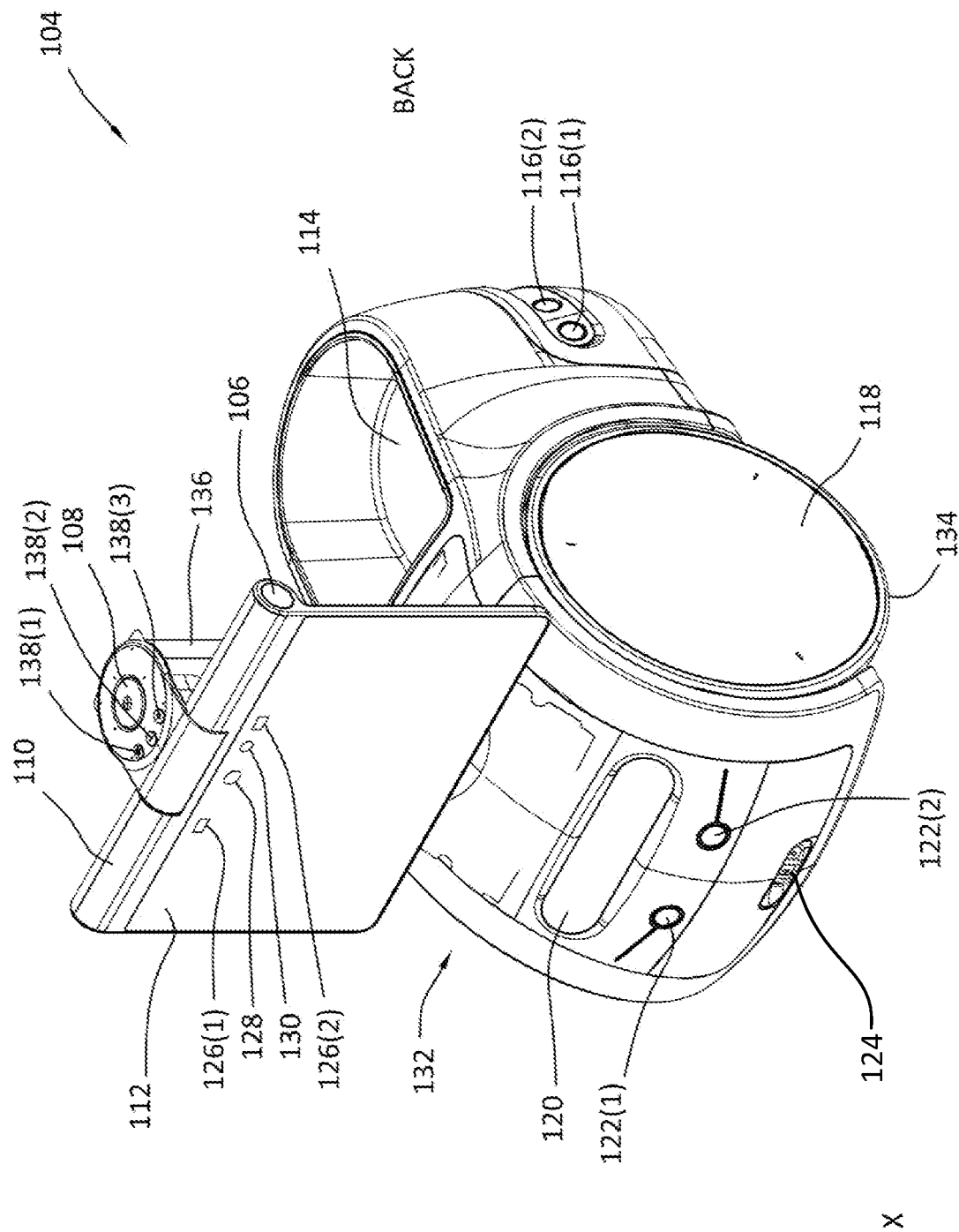
FIG. 1 illustrates a perspective view of an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) is a robot capable of autonomous movement that allows the AMD to move in a physical space without being driven or controlled by a user. The AMD may build up an electrostatic charge as the AMD moves through a physical space. Electrostatic discharges may be uncomfortable to users and damaging to sensors and electronics. The AMD may generate heat resulting from normal operation of internal components. The heat may thermally expand or contract AMD support structures that are used to mount sensors. If sensors rely on precise positioning relative to each other, the thermal expansion or contraction of a support structure may reduce the accuracy of sensor data by distorting that precise positioning.

To mitigate the effects of electrostatic charges, the AMD may use both an electrostatic dissipation structure and at least one electrically conductive wheel assembly. The electrostatic dissipation structure and the electrically conductive wheel assembly are electrically connected to a chassis ground. The electrostatic dissipation structure may be located on an aft underside portion of the chassis. The combination of both an electrostatic dissipation structure and electrically conductive wheels provides an unexpected improvement in dissipation of electrostatic charges.

The electrically conductive wheel assembly provides an electrically conductive path to the surface upon which the AMD is resting. Electrical resistance of this electrically conductive path may be greater than a metal conductor and less than an insulator. For example, the electrically conductive path between the chassis ground and a contact surface of the wheel assembly may exhibit a total resistance of between 1 kiloohm and 1 megaohm. In one implementation the electrically conductive wheel assembly may include a conductive tire mounted to a conductive wheel, and a conductive axle to which the conductive wheel is mounted. The axle of the conductive wheel assembly is mounted to a mounting structure affixed to a supporting structure of the AMD and the conductive wheel assembly is connected to the AMD chassis ground.

Parts of the AMD may accumulate electrostatic charges. For example, a sensor on a front of the AMD may accumulate an electrostatic charge. Such electrostatic charge could adversely affect operation of the sensor, damage the sensor or other electronics, or produce other undesired effects during electrostatic charging, while electrostatically charged, or during discharge of the electrostatic charge. To dissipate these charges, electrically conductive materials may be used in one or more of the structures or in the mounting to those structures. These electrically conductive materials provide a conductive path for electrostatic charges to be conveyed to the chassis ground, where that charge is dissipated into the surrounding physical space via the electrostatic dissipation structure.

The AMD may have sensors located in areas that may be susceptible to accumulating electrostatic charge more readily. For example, a front portion of the AMD that is near the bottom of the AMD may include time-of-flight sensors to detect objects on the floor in front of the AMD. This position may be prone to acquiring electrostatic charge while moving. To dissipate this electrostatic charge, electrically conductive materials may be used in one or more of the structures or in the mounting of the sensors to the structures that are then connected to the chassis ground. For example, the time-of-flight sensors may be mounted to the chassis using an electrically conductive resin that provides a conductive path to the chassis ground.

The time-of-flight sensors have covers to protect a photodetector and an emitter. The covers may have three portions or windows through which the light used by the photodetector and emitter may pass. These windows are arranged in a symmetrical pattern, allowing the cover to be installed without requiring a particular orientation.

Different parts of the AMD may have different coefficients of thermal expansion and may reach different temperatures during operation. If two connected parts of the AMD have different coefficients of thermal expansion, then a change in temperature may cause thermo-mechanical stress. For example, a temperature change may result in parts of the AMD expanding or contracting relative to other parts. Some sensors require precise positioning to provide accurate measurements during operation and thermo-mechanical stress may change a relative position of the sensors with respect to each other. Elastomeric components may be arranged between parts of the AMD to achieve a floating design to prevent this mechanical distortion. The floating design may mount a first structure to a second structure without the use of a rigid mounting. For example, an elastomeric foam may be used to join a stereocamera device to a supporting structure. The elastomeric components maintain the relative arrangement of the parts while allowing some movement to avoid buckling or warping, thereby mitigating mismatches in coefficients of thermal expansion.

By using the systems and techniques described in this disclosure, the AMD is able to mitigate the effects of electrostatic charges and heat. Upsets to sensors, processors, and other devices due to electrostatic discharges are eliminated or significantly reduced. This improves the quality and reliability of sensor data that may be used for autonomous operation. The dissipation of electrostatic charges also improves user comfort. The use of the elastomeric components reduces thermally induced strains to sensors, improving the accuracy of sensor data. This improved accuracy results in improved autonomous operation.

Illustrative System

FIG. 1 illustrates a perspective view of an autonomous mobile device (AMD) 104, according to some implementations. The AMD 104 includes a main body 132. During operation, the AMD 104 may perform various functions such as moving around a physical space, interacting with users, performing tasks, and so forth. The main body 132 may house various components such as batteries, processors, and so forth to support these functions. These components are discussed in more detail below with regard to FIGS. 7 and 8.

Figure 2:
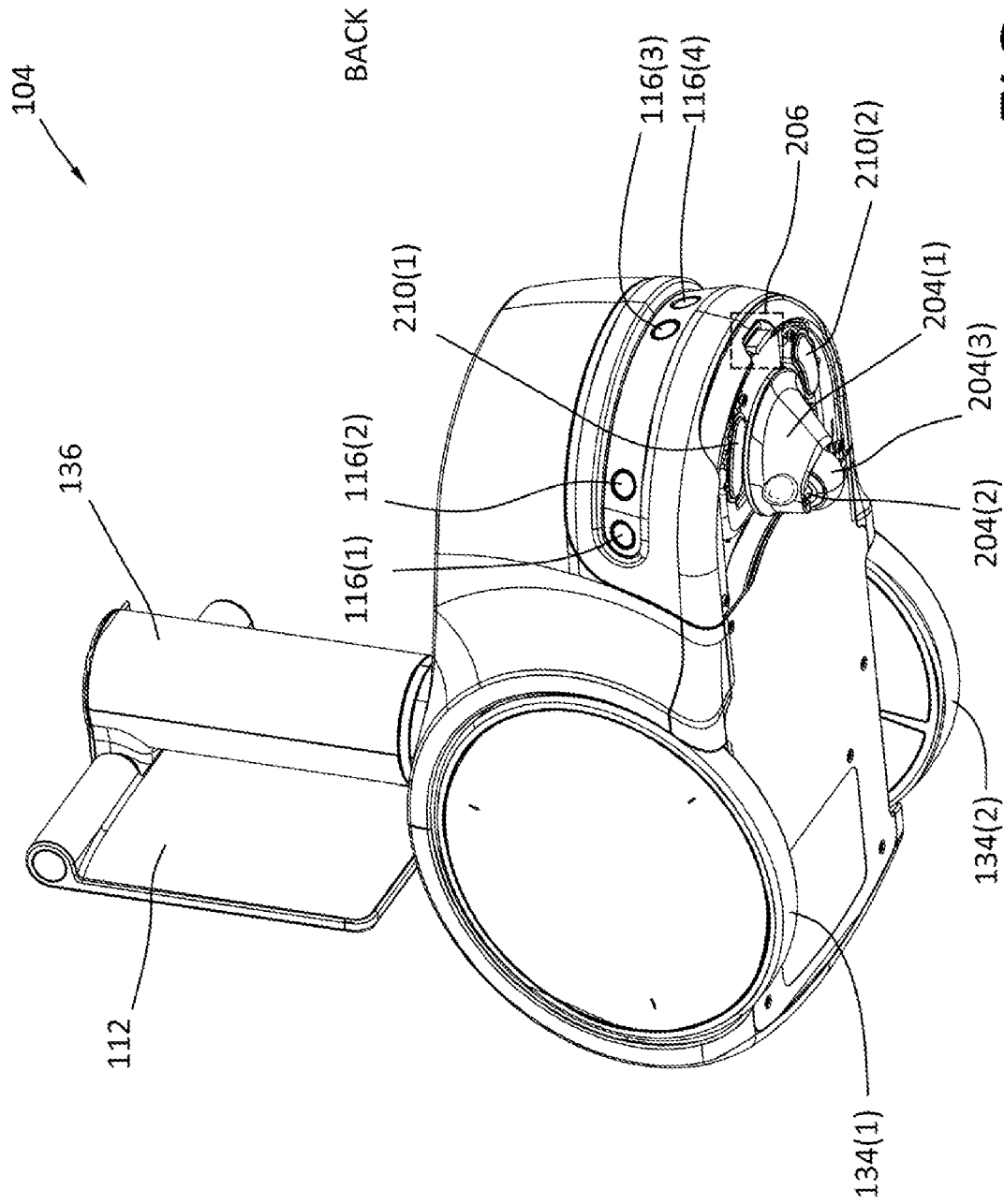
FIG. 2 illustrates a perspective view from below the AMD, according to some implementations.

As the AMD 104 moves around the physical space, the AMD 104 may build up an electrostatic charge. To dissipate electrostatic charges, the AMD 104 uses both an electrostatic dissipation structure and at least one electrically conductive wheel assembly. The electrostatic dissipation structure may be located on an aft portion of the chassis that is near the bottom portion of the chassis. The electrostatic dissipation structure is shown in FIG. 2. The electrically conductive wheel assembly may include a conductive wheel, a conductive tire mounted to the conductive wheel, a conductive axle, and a conductive mounting structure that mounts the conductive wheel assembly to a supporting structure of the AMD 104. The electrostatic dissipation structure and the electrically conductive wheel assembly are electrically connected to each other and electrically connected to a chassis ground. Using both an electrostatic dissipation structure and electrically conductive wheels unexpectedly provides better electrostatic discharge than individual use of either an electrostatic dissipation structure or electrically conductive wheels.

The electrostatic dissipation structure and the one or more electrically conductive wheel assemblies may be electrically connected to a conductive path that includes the chassis ground. The AMD 104 may include one or more circuit boards, sensors, and other electronic components. One or more of the circuits boards, sensors, and electronic components may be electrically connected to the chassis ground. In some examples, an electrical connection between a circuit board, sensor, or electronic component to the chassis ground may have one or more resistors.

In some implementations, the AMD 104 may include one or more electrically conductive wheel assemblies. For example, the AMD 104 may include two main wheels and a trailing caster wheel. A first wheel assembly includes a first main wheel. A second wheel assembly includes a second main wheel. A third wheel assembly includes the caster wheel. The first main wheel is shown as 134. The second main wheel is on a side of the AMD 104 that is not visible in FIG. 1. In a first example, the first wheel assembly may be electrically conductive, and the second wheel assembly and the third wheel assembly are non-conductive. In a second example, the first wheel assembly and the second wheel assembly are electrically conductive, and the third wheel assembly is non-conductive. In a third example, the first wheel assembly, the second wheel assembly, and the third wheel assembly are electrically conductive. In a fourth example, the third wheel assembly may be electrically conductive, and the first wheel assembly and the second wheel assembly are non-conductive.

A conductive wheel assembly may include a conductive wheel, a conductive tire mounted to the conductive wheel, a conductive axle, and a conductive mounting structure that mounts the conductive wheel assembly to a supporting structure of the AMD 104. In this example, a wheel assembly is conductive if the ohmic resistance of the wheel assembly does not exceed a first threshold. For example, the first threshold may be 10,000 ohms, which may be an ohmic resistance of an elastomer infused with a carbon fibers used in standard commercial equipment. Conductivity may also be specified according to a second threshold. For example, to prevent excessive electrostatic discharges, the second threshold may be indicative of ohmic resistance of at least 1,000 ohms. Conductivity of a wheel assembly may be measured from a contact area where a tire makes contact with a surface to a connection where the conductive mounting structure makes contact with the supporting structure of the AMD 104.

An electrostatic dissipation structure may comprise a plurality of electrically conductive strands that are exposed to an ambient environment. For example, the electrostatic dissipation structure may be a static wick. The electrostatic dissipation structure 206 is shown in FIG. 2. An electrostatic dissipation structure may comprise conductive strands that are carbon fibers, metal wires, and so forth. In other examples, an electrostatic dissipation structure may comprise a single extension of a conductive material that has a first end that attaches to an AMD 104 chassis ground and a second end that tapers to dissipate electrostatic charges. The second end may be a point, a ridge, and so forth. An electrostatic dissipation structure may comprise a conductive material that has a physical geometry that facilitates corona discharge. For example, the physical geometry may comprise a point, spike, ridge, or other feature that facilitates a concentration of electrostatic field to induce coronal discharge into the ambient environment. The physical geometry concentrates the electrostatic field to produce a field gradient that results in corona discharge into an ambient environment.

The main body 132 includes various components. A front of the AMD 104 includes a sensor window 120 and a sensor assembly 124. A back of the AMD 104 may include sensor windows 116(1) and 116(2). These sensor windows facilitate operation of various sensors. For example, if the sensor is a camera, the sensor window for that sensor is transparent to the wavelengths of light detected by the camera. In another example, if the sensor is an ultrasonic rangefinder, the sensor window may comprise a mesh that permits ultrasonic sound and corresponding echoes to pass through. The sensor assembly 124 may include time-of-flight (ToF) sensors used by a navigation module to avoid collisions with objects in front of the AMD 104. The ToF sensors are discussed with respect to FIG. 4.

Mobility for the AMD 104 may be provided by wheels. In the implementation shown, two main wheels 134 are depicted with a trailing caster assembly having a caster wheel (shown in FIG. 2). The two main wheels 134 and the caster wheel provides a tricycle or three-point support system. The main wheels 134 may be driven independently, allowing the AMD 104 to turn within a relatively small turn radius. Each of the main wheels 134 may have a wheel cover 118 that conceals a portion of the main wheel 134. The wheel cover 118 may include a visual indicator, such as a printed pattern, feature, and so forth that provides a visual indicator as to when the main wheel 134 is rotating.

The main wheel 134 may be sized to provide a relatively small gap between an outer edge of a tire and a portion of the main body 132. For example, the gap may be less than 3 millimeters (mm). By using a relatively small gap, fouling with foreign objects may be minimized.

The main body 132 may include a modular payload bay 114. The modular payload bay 114 provides one or more of mechanical or electrical connectivity with the AMD 104. For example, the modular payload bay 114 may include one or more engagement features such as slots, cams, ridges, magnets, bolts, and so forth that are used to mechanically secure an accessory within the modular payload bay 114. In one implementation, the modular payload bay 114 may comprise walls within which the accessory may sit. In another implementation, the modular payload bay 114 may include other mechanical engagement features such as slots into which the accessory may be slid and engaged.

The modular payload bay 114 may include one or more electrical connections. For example, the electrical connections may comprise a universal serial bus (USB) connection that allows for the transfer of data, electrical power, and so forth between the AMD 104 and the accessory.

A tower 136 extends upwards from the main body 132. An extensible mast 108 (mast) that is able to extend upwards is stowed at least partially within the tower 136 and may extend into the main body 132. The mast 108 may be used to elevate a payload relative to the main body 132. The tower 136 may pan left and right relative to the main body 132. In some implementations the mast 108 may pan in unison with the tower 136.

A top surface of the tower 136 may include one or more input devices, such as buttons 138(1)-(3). The buttons 138 may allow a user to perform functions such as turning the AMD 104 on or off, changing volume of sound produced by speakers on the AMD 104, and so forth.

A display assembly is affixed to an upper portion of the tower 136. For example, an upper edge of the display assembly is joined to the tower 136 by one or more hinges. The one or more hinges 106 permit the display assembly to tilt relative to the tower 136. For example, a right hinge 106 and a left hinge (not shown) are used to join the display assembly to a shaft (not shown) that extends from the tower 136. The display assembly may include a frame 110 that supports a first camera 126(1), a second camera 128, a third camera 130, a fourth camera 126(2), a display 112, and so forth. For example, the second camera 128 and the third camera 130 may comprise of a visible light camera. The first camera 126(1) and the fourth camera 126(2) may comprise depth cameras. The display 112 may comprise a touchscreen display that is able to present an image and accept input.

In some implementations, other types of apparatus may comprise an electrostatic dissipation structure and electrically conductive components that make contact with a surface. The electrically conductive components may be used by the apparatus to move, and may include wheels, wheel assemblies, mechanical legs, tracks, and so forth. For example, an apparatus may comprise a chassis, one or more electrically conductive components, an electrostatic dissipation structure, and a conductive path between a chassis ground, the one or more electrically conductive components, and the electrostatic dissipation structure.

FIG. 2 illustrates a perspective view from below the AMD 104, according to some implementations. The perspective view from below the AMD 104 illustrates a plurality of wheels and an electrostatic dissipation structure 206. The perspective view of FIG. 2 includes the tower 136, rear sensor windows 116, display 112, and main wheels 134(1), 134(2), as shown in FIG. 1.

The AMD 104 may comprise a plurality of wheel assemblies. The AMD 104 may include two main wheels 134 and a trailing caster wheel. A first wheel assembly includes a first main wheel. A second wheel assembly includes a second main wheel. A third wheel assembly 204 includes the caster wheel. The third wheel assembly 204 may comprise a caster body 204(1), an axle 204(2), and a wheel 204(3). The wheel 204(3) may comprise a tire mounted to the wheel 204(3). The tire may comprise an elastomeric material. The elastomeric material may comprise a conductive material such carbon. For example, the elastomeric material of the tire may be infused with more or less carbon particles based on a target level of ohmic resistance. In this example, the elastomeric material may have an ohmic resistance that is greater than 100 ohms and less than 100,000 ohms. A tire or wheel may comprise conductive plastic, thermoplastic polyurethane, metal, and so forth. For example, the tire or wheel may comprise a plastic fabricated from a resin that is infused with carbon-based materials. In other examples, the tire or wheel may comprise a plastic infused with other conductive materials. The caster body 204(1) may comprise a mounting structure. In this example, the third wheel assembly 204 may be electrically conductive based on a conductive path extending from the tire mounted to the wheel 204(3) to a chassis ground. In some implementations, a wheel assembly may have more of fewer parts. For example, a wheel may be used without a tire mounted to the wheel. As another example, the wheel assembly may include more than one wheel. In these examples, the more of fewer parts of the wheel assembly provide a conductive path from a surface on which the AMD 104 rests or moves to a conductive mounting structure that mounts the wheel assembly to a supporting structure of the AMD 104.

In this example, the conductive path may include the tire mounted to the wheel 204(3), the wheel 204(3), the axle 204(2), the mounting structure, and the chassis ground. The electrically conductive path allows the AMD 104 to dissipate accumulated static charge to the surface upon which the AMD 104 is resting or moving. In some implementations, there may be one or more resistors between a conductive wheel assembly and the chassis ground. For example, there may be one 10 kiloohm anti-surge chip resistor between one or more conductive wheel assemblies and the chassis ground. In other examples, the resistivity of the elastomeric material of the tire may be calibrated to provide a target level of ohmic resistance. For example, the elastomeric material of the tire may be infused with more or less carbon particles based on a target level of resistance.

Tires on each of the electrically conductive wheel assemblies may comprise a target element that extends around at least a portion of the outer circumference of a wheel. The target element is a conductive element that may comprise one or more pieces of a conductive material. In one implementation, the target element may be arranged around at most one half the circumferential surface of a wheel. The target element may comprise a strip, bar, sheet, film, or other arrangement of metal. For example, the target element may be a layer of aluminum that has been deposited onto or otherwise affixed to at most one half the circumferential surface. In another implementation the target element may comprise an electrically conductive polymer. In one implementation, the electrically conductive material may comprise a non-ferrous metal to prevent magnetic debris from being attracted to the wheel. For example, the target element may comprise one or more of aluminum or copper. A tire may comprise an elastomeric material and be arranged around a wheel and the target element.

In some implementations, some but not all parts of a wheel assembly may be electrically conductive or have different levels of conductivity. For example, a wheel assembly may comprise a tire, a wheel or caster, an axle, a mounting structure, and an engagement feature. The engagement feature may be a brush comprising conductive bristles or a conductive roller contact. The tire may be electrically conductive and as the wheel turns, the engagement feature makes contact with the tire. In this example, the engagement feature and the conductive tire are part of a conductive path and the remaining parts of the wheel assembly may or may not be part of the conductive path. The engagement feature may be electrically connected to the chassis ground.

In some implementations, the wheel assembly 204 may comprise a tire, a wheel or caster, an axle, a mounting structure, and an engagement feature. The engagement feature may be a brush comprising conductive bristles or a conductive roller contact. The tire may be electrically conductive and as the wheel turns, the engagement feature makes contact with the tire. In this example, the engagement feature and the conductive tire are part of a conductive path and the wheel is not conductive or part of the conductive path. The engagement feature may be electrically connected to the chassis ground 302.

In some implementations, the wheel assembly 204 may comprise a wheel or caster, an axle, a mounting structure, and an engagement feature. The engagement feature may be a brush comprising conductive bristles or a conductive roller contact. The wheel may be electrically conductive, and as the wheel turns, the engagement feature makes contact with the wheel. The engagement feature and the conductive wheel are part of the conductive path and the remaining parts of the wheel assembly 204 may or may not be part of the conductive path. In this implementation, the wheel assembly does not include a tire.

The electrostatic dissipation structure 206 may comprise a plurality of electrically conductive strands that are exposed to an ambient environment. The electrostatic dissipation structure 206 may comprise conductive strands that are carbon fibers, metal wires, and so forth. In other examples, the electrostatic dissipation structure 206 may comprise a single extension of a conductive material that has a first end that attaches to the AMD 104 and a second end that tapers to dissipate electrostatic charge. In some implementations, there may be one or more resistors between a conductive wheel assembly and the chassis ground. For example, there may be three 27 KO anti-surge chip resistors between one or more conductive wheel assemblies and the chassis ground.

In this example, the electrostatic dissipation structure 206 is located on an aft portion of the AMD 104. The electrostatic dissipation structure 206 is also located proximate to the bottom of the AMD 104. This location of the electrostatic dissipation structure 206 reduces potential exposure of the electrostatic dissipation structure 206 to a user, a pet, or to an object or device that may be sensitive to an electrostatic charge. In other examples, the electrostatic dissipation structure 206 may be located on a different portion of the AMD 104. For example, the electrostatic dissipation structure may be located on: an aft portion of the AMD 104 that is near the top of the AMD 104; a part of the tower 136; a side of the AMD 104; a front, bottom portion of the AMD 104; underneath the AMD 104; a wheel 134; or a top portion of the AMD 104.

In some implementations, the AMD 104 may have more than one electrostatic dissipation structure 206. For example, the AMD 104 may have a first electrostatic dissipation structure 206 as depicted in FIG. 2 and a second electrostatic dissipation structure (not depicted) on any of the locations listed above. In one example, the AMD 104 may have two electrostatic dissipation structures, with a first electrostatic dissipation structure on a first wheel 134(1) and a second electrostatic dissipation structure on a second wheel 134(2). A single region of the AMD 104 may have multiple electrostatic dissipation structures. For example, a single wheel 134 may include more than one electrostatic dissipation structures. As another example, the aft, bottom portion of the AMD 104 may have two electrostatic dissipation structures that are proximate to each other.

The electrostatic dissipation structure 206 comprises a conductive physical geometry that concentrates electrostatic fields to induce corona discharge. The physical geometry concentrates the electrostatic field to produce a field gradient that results in corona discharge into an ambient environment.

In some implementations, the AMD 104 may have different types of electrostatic dissipation structures 206 installed in either a single location or in different locations. For example, the AMD 104 may have two electrostatic dissipation structures 206, a first electrostatic dissipation structure 206 and a second electrostatic dissipation structure 206. The first electrostatic dissipation structure 206 may have first electrostatic dissipative properties depending on a first number of conductive strands or a first ohmic resistance of the conductive strands. The second electrostatic dissipation structure 206 may have second electrostatic dissipative properties depending on a second number of conductive strands or a second ohmic resistance of the conductive strands. The first electrostatic dissipation structure 206 and the second electrostatic dissipation structure 206 may be installed in a same area of the AMD 104 or in different areas of the AMD 104.

In some implementations, the electrostatic dissipation structure 206 may be located on a portion of a wheel, such as the main wheel 134. In this example, the main wheel 134 may have a recess for mounting the electrostatic dissipation structure 206. The recess may have a depth that results in the conductive strands of the electrostatic dissipation structure 206 to be flush to the side of main wheel 134. The recess may be proximate to a perimeter of the main wheel 134, which allows the electrostatic dissipation structure 206 to dissipate electrostatic charge as the electrostatic dissipation structure 206 moves through air as the main wheel 134 rotates.

In some implementations, instead of one or more wheel assemblies, the AMD 104 may comprise one or more mechanical legs that move the AMD 104. In this example, a leg assembly may include a mounting structure that mounts the leg assembly to a supporting structure of the AMD 104. The leg assembly may comprise a plurality of components that move together to move the AMD 104. In this example, a conductive path extends from a surface on which the AMD 104 rests or moves, through the plurality of components of the mechanical leg, and to the mounting structure that mounts the leg assembly to the supporting structure of the AMD 104. An electrostatic dissipation structure 206 may be installed on a part of one or more of the leg assemblies. For example, an electrostatic dissipation structure 206 may be installed on a back of a mechanical leg.

Inductive sensors may be located on an aft, bottom portion of the AMD 104. The inductive sensors may be used to dock the AMD 104 in a dock. The AMD 104 may approach the dock, turn around, and navigate backwards into the dock until charging contacts 210(1)-(2) on the AMD 104 are in contact with associated charging pins on the dock. For example, the one or more inductive sensors may determine a proximity to metallic targets on the dock. The AMD 104 may determine instructions to turn the AMD 104 either left or right based on a proximity of a given inductive sensor to an associated metallic target. As the AMD 104 moves backward, the AMD 104 turns to align the charging contacts 210(1)-(2) on the AMD 104 with charging contacts on the dock.

Figure 3:
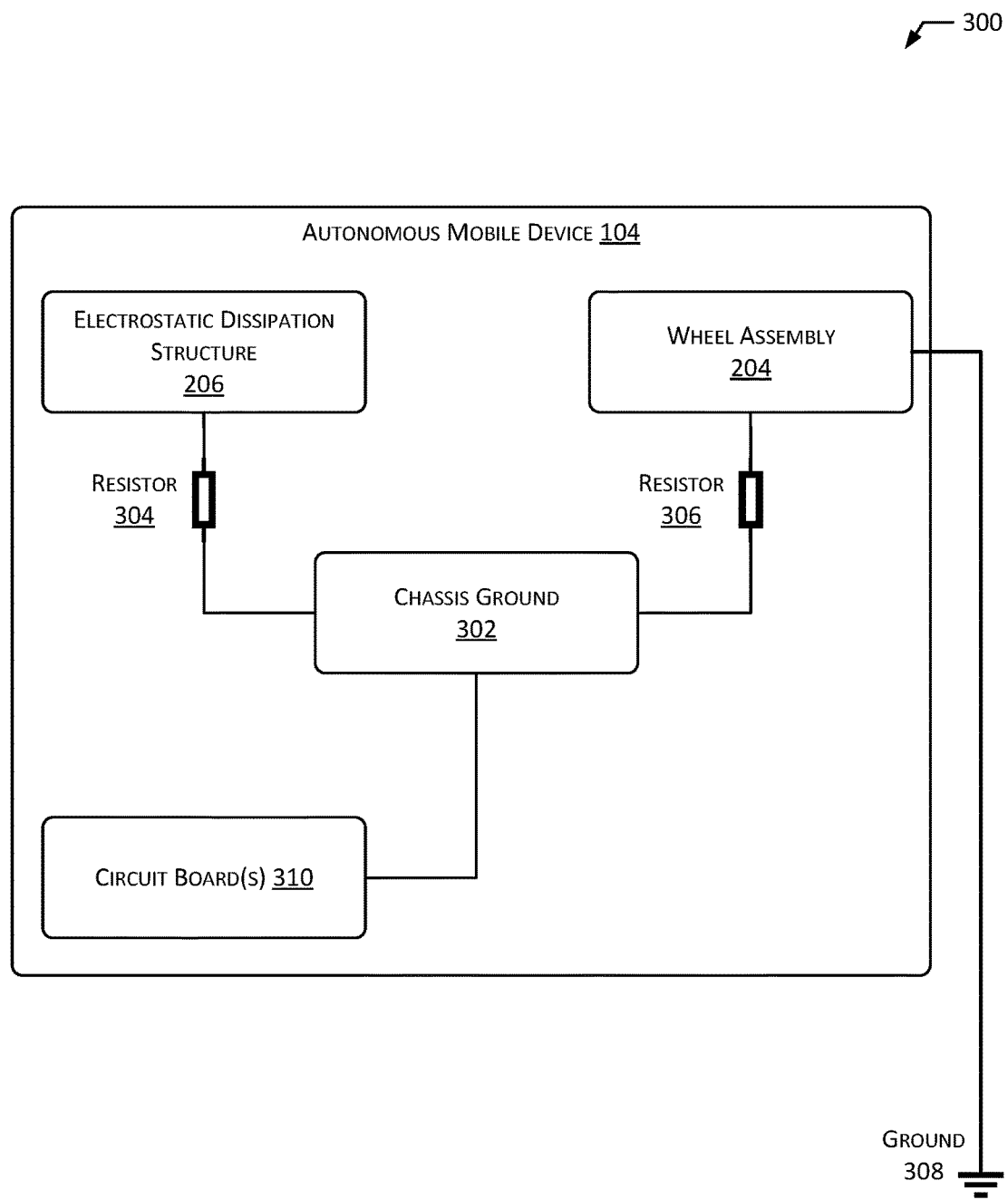
FIG. 3 illustrates a block diagram of a conductive path between an electrostatic dissipation structure, a wheel assembly, and a chassis ground, according to some implementations.

FIG. 3 illustrates a block diagram 300 of a conductive path between an electrostatic dissipation structure 206, a wheel assembly 204, and a chassis ground 302, according to some implementations.

A conductive path through which electrostatic charges may be dissipated may include the electrostatic dissipation structure 206, one or more wheel assemblies 204, and the chassis ground 302. Electrical resistance of this electrically conductive path may be greater than a metal conductor and less than an insulator. For example, the electrically conductive path between the chassis ground and the point of contact of the wheel assembly may exhibit a total resistance of between 1,000 ohms and 1 megaohm. In this example, there is a resistor 304 between a conductive path between the electrostatic dissipation structure 206 and the chassis ground 302. For example, the resistor 304 may comprise three 27,000 ohm anti-surge chip resistors. In other examples, the electrostatic dissipation structure 206 may be directly electrically connected to the chassis ground 302. Similarly, in this example, the one or more wheel assemblies 204 may include one or more resistors 306 between a conductive path between the one or more wheel assemblies 204 and the chassis ground 302. For example, resistor 306 may have a value of 10,000 ohms. The one or more resistors 306 may have a higher or lower ohmic resistance. For example, a statically dissipative ohmic resistance may be between 100,000 (1E5) to 10,000,000,000,000 (1E13) ohms. A statically dissipative ohmic resistance may be a resistance that allows for electrostatic discharge in a controlled manner because materials with a statically dissipative ohmic resistance are not too conductive or too resistive of an electrostatic discharge. For example, a conductive path with a statically dissipative ohmic resistance between 1E5 and 1E13 ohms may be associated with an electrostatic discharge over several milliseconds. In contrast, conductive materials with ohmic resistances less than 1E5 ohms may be associated with an electrostatic discharge measured in nanoseconds (less than a millisecond). The inclusion of resistor 306 may reduce electromagnetic interference (EMI) in the AMD 104. The wheel assembly 204 may provide a conductive path to earth ground 308. For example, the wheel assembly 204 may transfer an electrostatic charge from the chassis ground, through one or more parts of the wheel assembly 204, and to a contact area of a surface within a physical space. In other examples, the one or more wheel assemblies 204 may be directly electrically connected to the chassis ground 302. In other examples, a conductive path through which electrostatic charges may be dissipated may include the electrostatic dissipation structure 206, one or more wheel assemblies 204, motor(s), circuit board(s) 310, and the chassis ground 302.

In some implementations, the AMD 104 may have more than one electrostatic dissipation structures 206. For example, the AMD 104 may have one or more electrostatic dissipation structures 206 located on one or more of: an aft portion of the AMD 104 that is near the top of the AMD 104; a part of the tower 136; a side of the AMD 104; a front, bottom portion of the AMD 104; underneath the AMD 104; a wheel 134; or a top portion of the AMD 104.

Circuit board(s) 310 may comprise various electronic components of the AMD 104. For example, circuit board(s) 310 may include: a first circuit board comprising memory and one or more processors, a second circuit board comprising motor control circuitry, and so forth. The memory, processors, and so forth are described with respect to FIG. 7.

Figure 4:
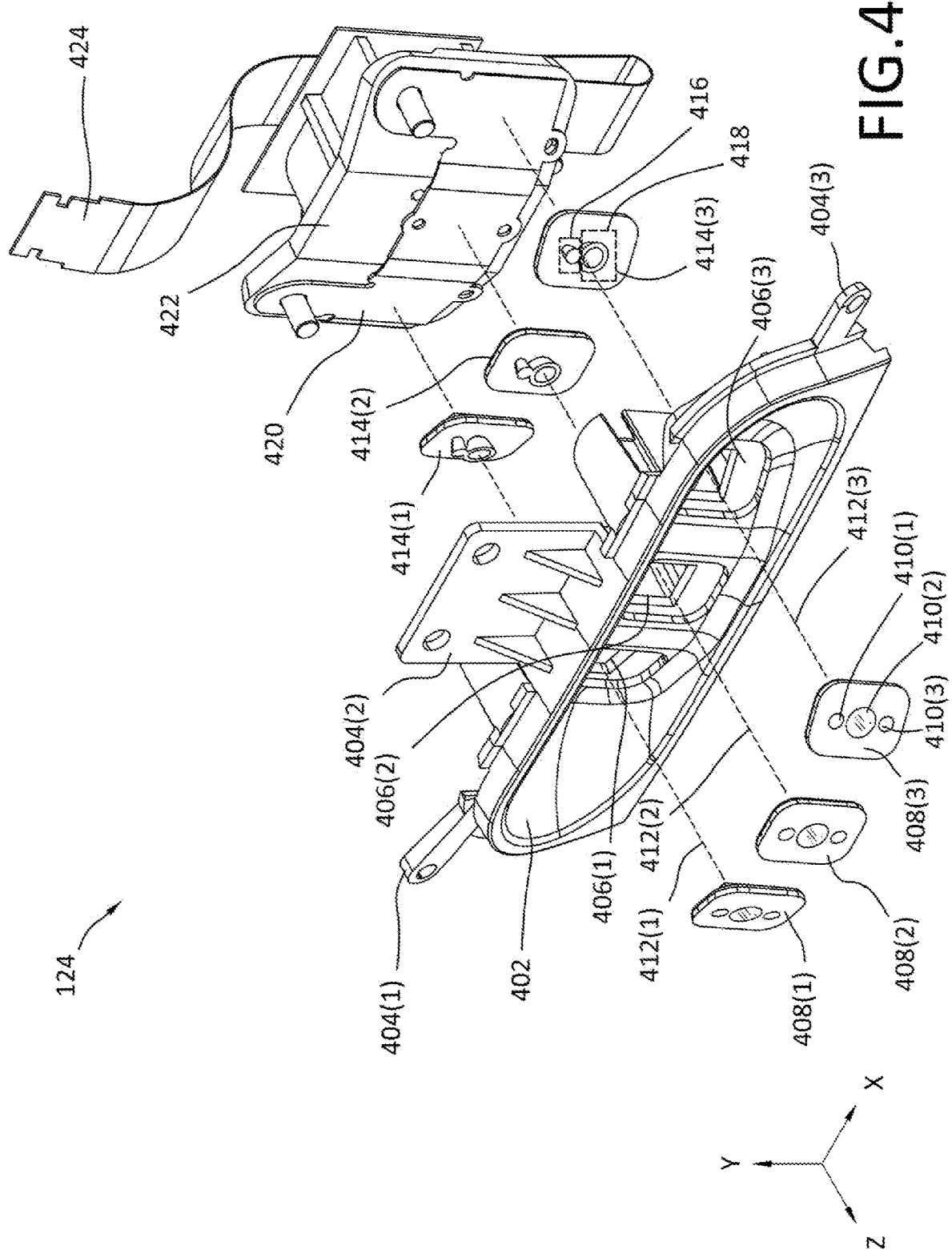
FIG. 4 illustrates a sensor assembly mounted to a support structure using a conductive material, according to some implementations.

FIG. 4 illustrates a sensor assembly mounted to a support structure using a conductive material, according to some implementations.

A sensor assembly 124 may be installed at various locations of the AMD 104. In this example, the sensor assembly 124 is mounted on a front portion of the AMD 104 that is proximate to a bottom portion of the AMD 104. The location of the sensor assembly 124 is depicted in FIG. 1. The sensor assembly 124 in FIG. 1 may include three sensor windows which are labeled as windows 408(1)-(3). Window 408(1) is installed within opening 406(1). Window 408(2) is installed within opening 406(2). Window 408(3) is installed within opening 406(3).

Windows 408(1)-(3) may fit, respectively, within openings 406(1)-(3) of a first structure 402. The first structure 402 may be mounted or fastened to a second structure 422. Conductive material 420 may be installed between the first structure 402 and the second structure 422. The first structure 402 includes engagement features 404(1)-404(3). In this example, engagement features 404(1)-(3) allow the sensor assembly 124 to be attached to a support structure on the AMD 104 (not shown).

The conductive material 420 may be a conductive plastic, metal, and so forth. For example, the conductive material 420 may comprise a plastic fabricated from a resin that is infused with carbon-based materials. In another example, the conductive material 420 may be a pressure-sensitive adhesive that is electrically conductive. For example, the conductive material 420 may be infused with more or less carbon particles based on a target level of resistance. In this example, the conductive material 420 may have an ohmic resistance that is greater than 1,000 ohms and less than 10,000 ohms.

Sensors 414(1)-(3) may be various ones of the sensors described below with respect to FIGS. 7 and 8. In this example, sensors 414(1)-(3) are time-of-flight sensors. The sensors 414(1)-(3) may each include an image sensor, an optical emitter, a window, and circuitry. The sensors 414(1)-(3) may be mounted onto the conductive material 420. The sensors 414(1)-(3) may be connected to a cable 424 to communicate with one or more computing modules of the AMD 104. Three axes, 412(1)-(3), are used to illustrate alignment of: an individual sensor, an individual opening in the first structure 402, and an individual window covering an opening. For example, sensor 414(1), opening 406(1), and window 408(1) are along axis 412(1). Sensor 414(2), opening 406(2), and window 408(2) are along axis 412(2). Sensor 414(3), opening 406(3), and window 408(3) are along axis 412(3). The three axes, 412(1)-(3), may be parallel to one another.

In this example, sensors 414(1)-(3) may be used to determine objects and distances to objects. Data from the sensors 414(1)-(3) may be used for collision avoidance by a safety module or a navigation module. Because of the sensors 414(1)-(3) being positioned on a front of the AMD 104, the sensors 414(1)-(3) are susceptible to accumulations of electrostatic charge. The conductive material 420 between the sensors 414(1)-(3) and the second structure 422 dissipates at least some of the electrostatic charges built up during operation of the AMD 104.

Windows 408(1)-(3) include areas that are transmissive to a first wavelength of light and areas that are opaque to the first wavelength of light. The opaque areas may filter out ambient light that has the first wavelength of light and improve the accuracy of sensor data. For example, first area 410(1), second area 410(2), and third area 410(3) are transmissive to the first wavelength of light. The remaining area of the surface of the window 408, on either a side facing away from the sensors 414(1)-(3) or a side facing towards the sensors 414(1)-(3), may be opaque to the first wavelength of light.

In this example, the sensor 414(3) may have an optical emitter that transmits light of the first wavelength from an area of the sensor 414(3) associated with area 418. The sensor 414(3) may also have an image sensor that receives light of the first wavelength through an area 416 of the sensor 414(3). The first area 410(1), with respect to the second area 410(2), is symmetrically opposite of the third area 410(3). Based on this symmetry, the window 408(3) may be installed into the first structure 402 in at least two different directions. As a first example, for a first installation (as shown), the third area 410(3) is closer to a bottom of the AMD 104 than the first area 410(1). Light emitted from the optical emitter may pass through the second area 410(2) and be received through the first area 410(1). As a second example, for a second installation (not shown), the first area 410(1) may be closer to a bottom of the AMD 104 than the third area 410(3). In this second example, light emitted from the optical emitter may pass through the second area 410(2) and be received through the third area 410(3).

Figure 5:
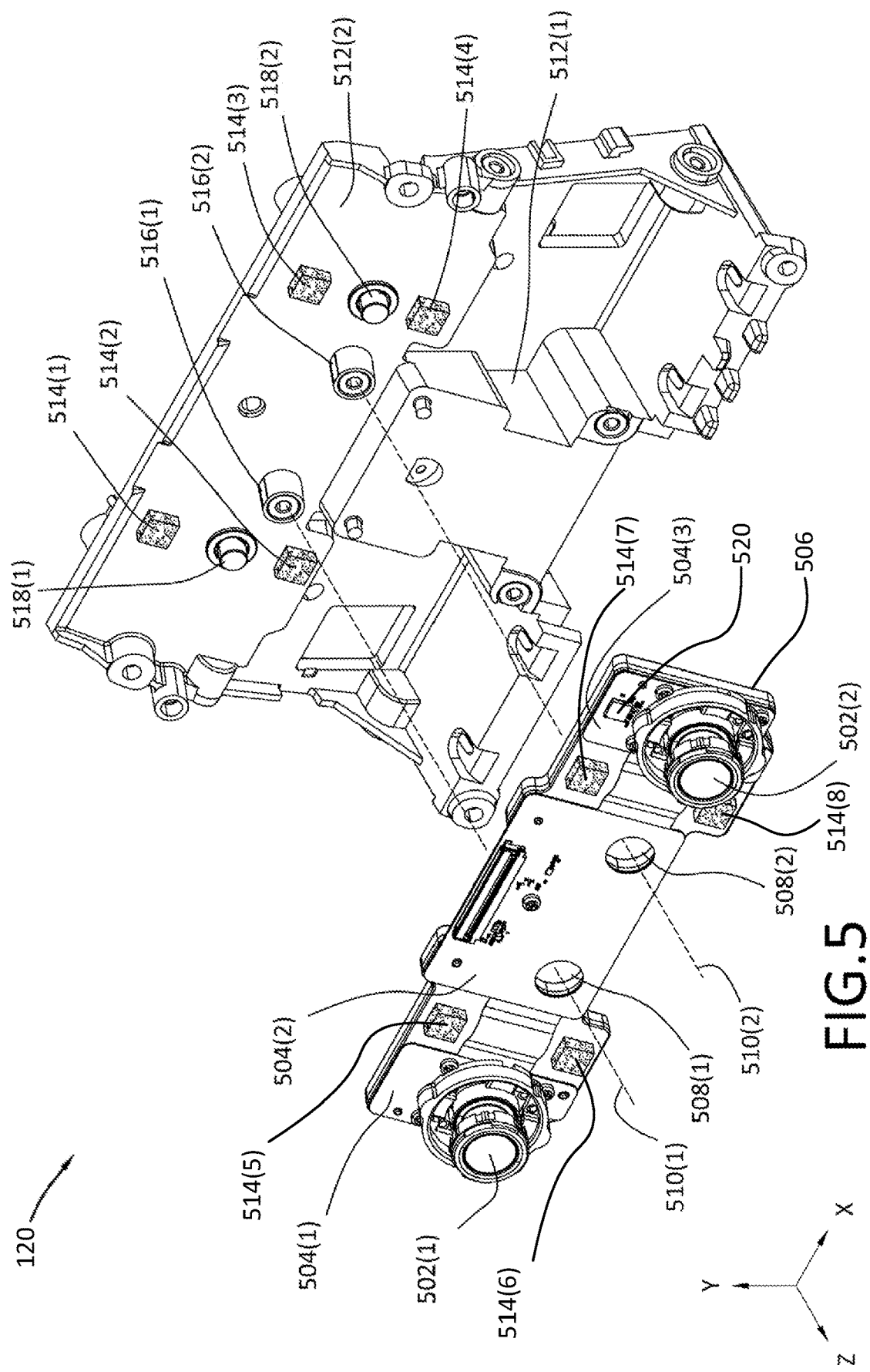
FIG. 5 illustrates a sensor assembly mounted to a support structure using elastomeric components, according to some implementations.

FIG. 5 illustrates a sensor assembly mounted to a support structure using elastomeric components, according to some implementations. The sensors 502(1)-(2) depicted in FIG. 5 are located behind the sensor window 120 on a front portion of the AMD 104. The sensor window 120 is depicted in FIG. 1.

To reduce effects of thermal expansion or thermal contraction, the AMD 104 uses elastomeric components to join a support structure to a structure on which sensors 502 are mounted. The support structure may be a first structure 512 and the structure on which sensors 502 are mounted may be a second structure 506. For example, the first structure 512 may extend from or be attached to the chassis. The first structure 512 may support a third structure 504. The sensors 502(1), 502(2) may be affixed to different portions of the third structure 504. For example, sensor 502(1) may be affixed to first portion 504(1) and sensor 502(2) may be affixed to third portion 504(3). The second portion 504(2) may have holes 508(1), 508(2) and may provide support to additional structures. The first structure 512 may have a first portion 512(1) that is mounted to the chassis. The first structure 512 may have a second portion 512(2) that has a surface from which two engagement features 516(1), 516(2) extend.

The second structure 506 may include an inertial measurement unit (IMU) 520 to generate IMU data. The IMU data may be indicative of one or more of a tilt value relative to local vertical, linear acceleration with respect to one or more axes, rotation with respect to one or more axes, and so forth. In one implementation, the sensors 502 may be stereo cameras and the tilt value associated with image data may be used to adjust for perspective effects of the image data. In other implementations, other data from the IMU 520 may be used during operation. The IMU data may be used to more accurately map a physical area using the simultaneous localization and mapping (SLAM) technique described below. The elastomeric components 514 may absorb at least some of the vibrations of the first structure 512. In particular, the elastomeric components 514 may reduce the amplitude of high frequency vibrations with frequencies greater than 1,000 Hertz. Vibrations may introduce inaccuracies into IMU data measurements. For example, the chassis may experience vibrations from operation of a motor, from movement across a floor, from operation of an onboard speaker, or from some other source. Because the sensors 502 are mounted on a second structure 506 that is mounted on the first structure 512, the second structure 506 is susceptible to vibrations transferred from the first structure 512. The elastomeric components 514 dissipate at least some of the vibrations of the first structure 512, reducing the transfer of those vibrations to the second structure 506. As a result, data generated by sensors 502 on the second structure 506 may exhibit less noise due to vibrations. For example, the amplitude of high frequency noise in the IMU data may be reduced.

In this example, the engagement features 516(1)-(2) are cylindrical pegs. In other examples, the engagement features 516(1)-(2) may be a different shape, and there may be more or fewer engagement features 516(1)-(2). The engagement features 516(1), 516(2) may fit within holes 508(1), 508(2), respectively. The engagement features 516(1), 516(2) may respectively fit within holes 508(1), 506(2) with enough space around the engagement features 516(1), 516(2) that the engagement features 516(1), 516(2) may move due to thermal expansion or contraction without exerting force on the second structure 506 through holes 508(1), 508(2). Engagement feature 516(1) fits within hole 508(1) as depicted by axis 510(1).

In this example, the sensors 502 may be stereo cameras mounted a first distance apart from each other. Algorithms that process image data acquired from the stereo cameras may process the image data based on the first distance being constant. For example, if the first distance does not change, or changes less than a threshold distance, then the image data may be associated with a first level of confidence. If the first distance changes by more than the threshold distance, then a confidence level associated with the image data may be a second level of confidence. The second level of confidence may be lower than the first level of confidence. The first distance may be measured along a horizontal axis that runs through the center of holes 508(1), 508(2) in a left-to-right direction. Engagement feature 516(2) fits within hole 508(2) as depicted by axis 510(2). In this example, thermal expansion or thermal contraction may change a second distance between the engagement features 516(1), 516(2). As noted above, in such an example, the engagement features 516(1), 516(2) may fit within holes 508(1), 508(2) with enough space around the engagement features 516(1), 516(2) that the engagement features 516(1), 516(2) may move left-to-right along the horizontal axis due to thermal expansion or contraction without exerting force on the second structure 506 through holes 508(1), 508(2).

In some examples, as the first structure 512 is heated, the first structure 512 may undergo thermal expansion or thermal warping that causes one or more of the engagement features 516(1), 516(2) to move front-to-back, with respect to the front and back of the AMD 104. In such an example, the engagement features 516(1), (2) may move front-to-back within the holes 508(1), 508(2) without placing any tension on the second structure 506. In this example, if fasteners are affixed to the ends of the engagement features 516(1)-(2) the fasteners retain the second structure 506 on the engagement features 516(1)-(2), the fasteners allow space between the fasteners and the second structure 506. This provides space for thermally induced mechanical displacement of the first structure 512 in a front-to-back direction. Because the space around the engagement features 516(1), 516(2) within the holes 508(1), 508(2) allows for motion of the engagement features 516(1), 516(2) in multiple directions, the first structure 512 may undergo shear stress or torsion stress due to thermal contraction or expansion without transferring any stresses to the second structure 506.

In some examples, engagement feature 516(1) may have a hole through which a first fastener, such as a screw, rivet, or other type of fastener may be installed. The first fastener may have a head that prevents the second structure 506 from sliding off, but the first fastener may allow for movement of the second structure 506 relative to the first structure 512. Similarly, engagement feature 516(2) may have a hole through which a second fastener such as a screw, rivet, or other type of fastener may be installed. The second fastener, similar to the first fastener, may have a head that prevents the second structure 506 from sliding off, but the second fastener may allow for movement of the second structure 506 relative to the first structure 512.

Engagement features 518(1), 518(2) may also be used to provide support to the second structure 506 without being fastened to the second structure 506 and without extending through the second structure 506. The engagement features 518(1), 518(2) may comprise rubber sleeves that may absorb displacement of the first structure 512 caused by thermal mechanical loads and allow the first structure 512 to move in radial directions. The engagement features 518(1), 518(2) may fit within holes 602 (shown in FIG. 5) with enough space around the engagement features 518(1), 518(2) that the engagement features 518(1), 518(2) may move due to thermally induced mechanical displacement without exerting force on the second support 506.

Figure 6:
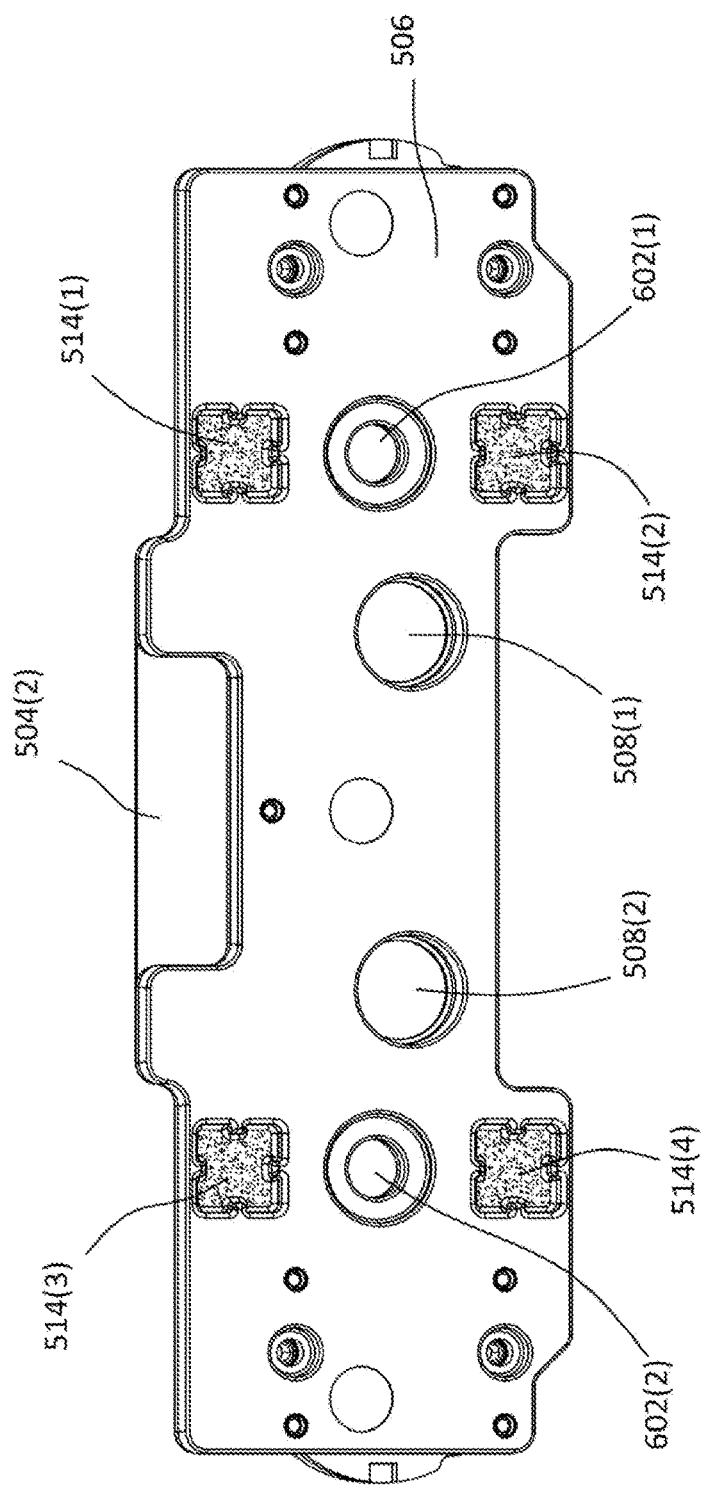
FIG. 6 illustrates a sensor assembly mounted to a support structure using elastomeric components, according to some implementations.

The sensors 502 may rely on precise relative positioning for accurate measurements. For example, the sensors 502 may be a stereo camera, and sensor 502(1) may be a first camera and sensor 502(2) may be a second camera. One or more elastomeric components 514 may be used. The elastomeric components 514 may be various types of elastomer, such as an elastomeric foam or some other elastomeric material. In a first example, four elastomeric components 514(1)-(4) are shown each having two adhesive sides. To join the first structure 512 to the second structure 506, a first adhesive side may be adhered to the first structure 512 and a second adhesive side may be adhered to the second structure 506. In some examples, the elastomeric components 514(1)-(4) may have an adhesive applied to adhere to both the first structure 512 and the second structure 506. In a second example, the four elastomeric components 514(1)-(4) each have a single adhesive side. The four elastomeric components 514(1)-(4) may be attached using an adhesive side to the second portion of the first structure 512(2). The four elastomeric components 514(1)-(4) may be joined to the second structure 506 by being fitted within a respective recess 514(1)-(4). The recesses 514(1)-(4) are depicted in FIG. 6. In a third example, the second structure 506 may have four elastomeric components 514(5)-(8) attached. The four elastomeric components 514(5)-(8) may be used to attach a third structure (not shown) similarly to how the second structure 506 is attached to the first structure 512. The third structure may be used to mount an additional one or more sensors, such as a depth sensor.

In different implementations, the elastomeric components 514(1)-(4) may have different electrical properties. In a first implementation, one or more of the elastomeric components 514(1)-(4) may be electrically conductive. For example, the elastomeric components 514(1)-(4) may have an ohmic resistance that is greater than 1,000 ohms and less than 10,000 ohms. Conductive elastomers may mitigate effects of electromagnetic interference (EMI) by altering the path of EMI or absorbing EMI that may otherwise affect electronic components such as sensors 502(1)-(2) and the IMU 520. In a second implementation, the elastomeric components 514 (1)-(4) may be electrically insulating. For example, the elastomeric components 514(1)-(4) may have an ohmic resistance greater than 10 megaohms. In other examples, the elastomeric components 514(1)-(4) may have a higher or lower ohmic resistance. For example, the elastomeric components 514(1)-(4) may have a statically dissipative ohmic resistance between 1E5 and 1E13 ohms.

The elastomeric components 514(1)-(4) may provide thermal separation between the first structure 512 and the second structure 506. For example, the elastomeric components 514(1)-(4) may comprise a material that insulates against heat transfer. The elastomeric components 514(1)-(4) may have a lower thermal conductivity than the first support structure 512. For example, the elastomeric components 514(1)-(4) may have a thermal conductivity below 0.5 watts per meter-kelvin. In other examples, the second structure 506 may be proximate to, or exposed to, an ambient environment. In this example, the elastomeric components 514 (1)-(4) may be conductive to heat sufficient to allow the second structure 506 to absorb and dissipate heat into the ambient environment.

In some implementations, the elastomeric components 514(1)-(4) may be held in place by fitting within recesses of the first structure 512 and the second structure 506. For example, a first elastomeric component 514(1) may have a thickness that allows for a first portion of the elastomeric component 514(1) to fit within a first recess in the first structure 512 and a second portion of the elastomeric component 514(1) to fit within a portion of a second recess in the second structure 506. Similarly, the other elastomeric components 514(2)-(4) may fit within respective recesses of the first structure 512 and the second structure 506. In this example, the engagement features 518(1), 518(2) may keep the second structure 506 in place relative to the first structure 512 within the movement tolerances allowed by the fit of the engagement features 518(1), 518(2) within the holes 508(1), 518(2).

FIG. 6 illustrates a sensor assembly mounted to a support structure using elastomeric components, according to some implementations.

This view, which is a different perspective of the first structure 512 and second structure 506, shows the locations where the elastomeric components 514(1)-(4) are attached. As depicted, the second structure 506 includes four recesses. A first recess is where the first elastomeric component 514(1) attaches. A second recess is where the second elastomeric component 514(2) attaches. A third recess is where the third elastomeric component 514(3) attaches. A fourth recess is where the fourth elastomeric component attaches. In another example, each of the elastomeric components 514(1)-(4) may attach to a flat surface of the second structure 506.

The second structure 506 includes a fifth recess 602(1) and a sixth recess 602(2). The fifth recess 602(1) is where engagement feature 518(1) fits. The sixth recess 602(2) is where engagement feature 518(2) fits. As described above, engagement features 518(1)-(2) may comprise rubber sleeves. In such an example, the engagement features 518(1)-(2) may engage with respective recesses 602(1)-(2), and a flange of the rubber sleeve may fit along a surface of the recess. In this example, the recesses 602(1), 602(2) are circular, but in other examples, the recesses 602(1), 602(2) may be other shapes corresponding to a shape of an associated engagement feature 518.

Figure 7:
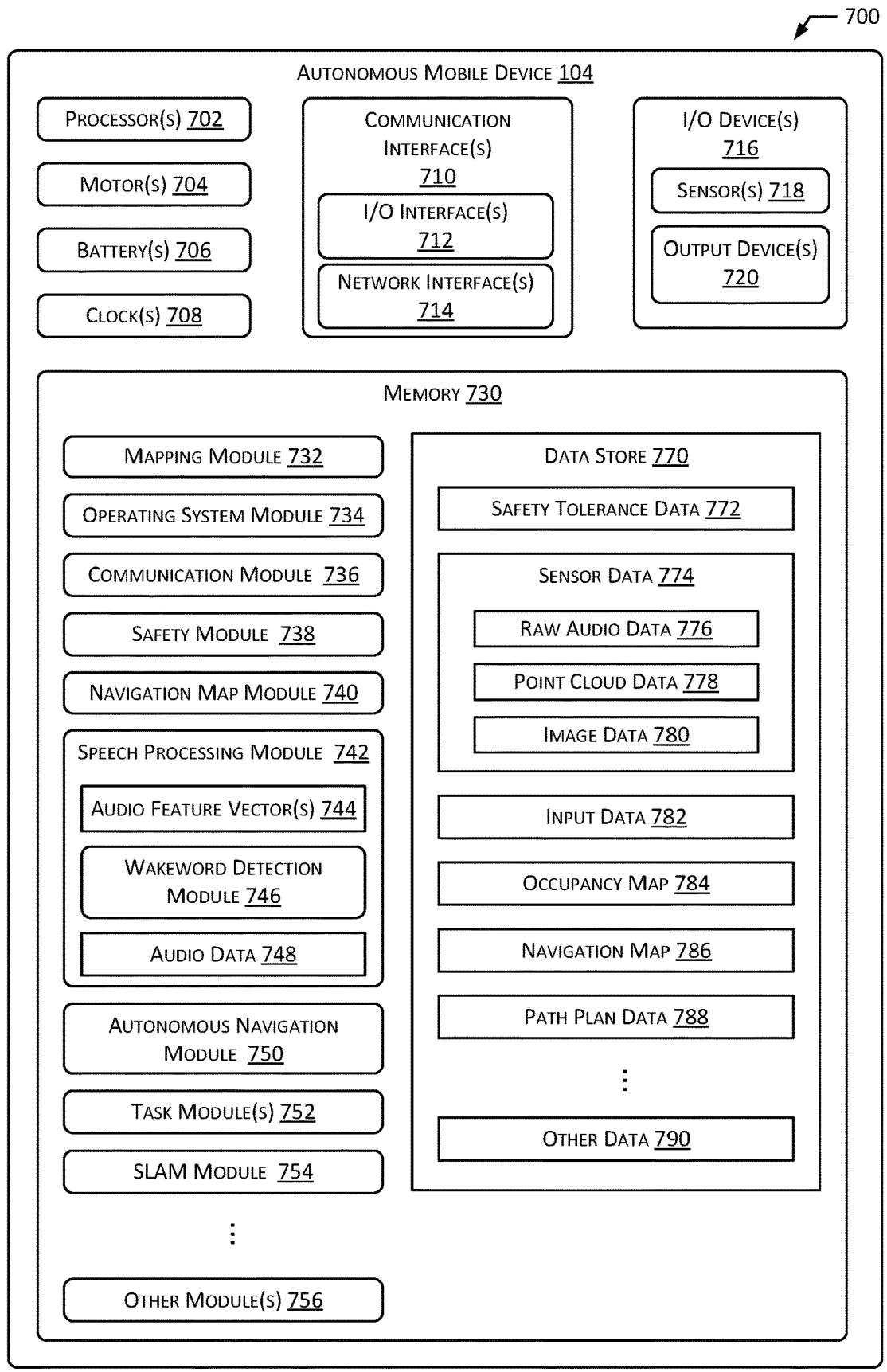
FIG. 7 illustrates a block diagram of the AMD, according to some implementations.

FIG. 7 illustrates a block diagram 700 of the AMD 104, according to some implementations.

The AMD 104 may include one or more batteries 706 to provide electrical power suitable for operating the components in the AMD 104. The battery 706 may be rechargeable, allowing it to store electrical energy obtained from an external source. In some implementations other devices may be used to provide electrical power to the AMD 104. For example, power may be provided by wireless power transfer, capacitors, fuel cells, storage flywheels, and so forth. In other implementations a wireless power receiver may be used to provide power for operation of the AMD 104, recharge the battery 706, and so forth.

An occupancy map 784 is determined using sensor data 774 from one or more sensors 718 and provides information about where objects are in the physical space. The occupancy map 784 comprises cells in a specified arrangement, a grid of cells. Each cell may be represented by an index value indicative of that cell within the grid. Each cell is associated with a particular location in the physical space. For example, each cell may represent an area in the physical space that is 5 centimeters (cm) by 5 cm. Each cell may also be associated with an occupancy value that indicates whether the particular area in the physical space associated with that cell is occupied by an object, unoccupied, or whether there is no data that is associated with that cell being unobserved. For example, an occupancy value of -1 may indicate an unoccupied cell with no object, an occupancy value of 0 indicates the cell has been unobserved, while +1 indicates the cell is occupied by an object. For ease of discussion, and not necessarily as a limitation, description with regard to cells may refer to the data associated with the cells or, as appropriate, the physical space associated with the cell. For example, an action such as moving to a cell may comprise moving the AMD 104 to the physical space associated with the cell.

The sensors 718 on the AMD 104 or in the physical space acquire the sensor data 774. The sensor data 774 is processed to determine information such as a current location of the AMD 104 in the physical space, and to provide the information that is used to determine the occupancy map 784. The sensors 718 exhibit various limitations, including a particular field of view (FOV), working range, may require line of sight to operate, exhibit blind spots, and so forth. Except for very unusual circumstances such as very simple physical spaces, the sensors 718 are not able to simultaneously see all of the areas in the physical space. As a result, the AMD 104 gathers information about the physical space by moving and directing the FOV of the sensors 718 in different directions.

Sensors 718 may include sensors that rely on precise positioning relative to other sensors. As described above, the AMD may generate heat resulting from normal operation of internal components. The heat may thermally expand or contract AMD support structures that are used to mount sensors. If sensors rely on precise positioning relative to each other, the thermal expansion or contraction of a support structure may reduce the accuracy of sensor data by distorting that precise positioning. For example, sensors 718 may include ultrasonic sensors 122(1)-(2) and the exposed surface is part of the sensor body. Sensors 718 may also include stereo cameras (mounted behind a sensor window 120) that rely on being a fixed distance apart from each other. Using elastomeric components to mount sensors to support structures of the AMD 104 may maintain sensor data accuracy by preventing changes to relative sensor positioning. Sensors 718 may be susceptible to damage due to uncontrolled electrostatic discharges. To mitigate effects of electrostatic discharges, the AMD 104 may use both an electrostatic dissipation structure 206 and at least one electrically conductive wheel assembly 204. For example, the sensor assembly for the time-of-flight sensors are at the front of the AMD 104 and may be electrically connected to the chassis ground 302. The electrostatic dissipation structure 206 and the electrically conductive wheel assembly 204 are also electrically connected to a chassis ground 302. The combination of both an electrostatic dissipation structure 206 and electrically conductive wheels provides an unexpected improvement in dissipation of electrostatic charges.

As the AMD 104 moves through the physical space, it uses simultaneous localization and mapping (SLAM) to determine where it is and how far it has moved. Localization is the process of determining where the AMD 104 is in the physical space. For example, cameras may acquire images. These images are processed to determine the presence of features in the images, such as edges of doors, a picture frame on a wall, and so forth. A descriptor is information that describes a particular feature. Various techniques such a scale-invariant feature transform (SIFT) may be used to characterize the features and generate the descriptors. The SLAM may use data from other sensors such as motor encoders, inertial measurement units (IMU) with one or more accelerometers and gyroscopes, and so forth.

While the AMD 104 is moving and SLAM is operating, SLAM provides as output a series of poses, each pose describing a location and rotations in space that are based at least in part on the apparent motion of observed features in the images. For example, a pose may comprise information about six dimensions (6D), that of three orthogonal axes and corresponding rotations about those axes. These poses may be combined to provide a trajectory of the AMD.

While the AMD 104 is moving, the SLAM module 754 may provide as output a series of poses, each pose describing a location and rotations in the physical space. Each pose is based at least in part on the apparent motion of observed features in images acquired by the AMD 104. For example, from image to image at least some of the features that are described by descriptors will be in common. By determining the relative difference in apparent position in the image of the same feature as observed by two different cameras at the same time, the location of the camera with respect to the feature in the physical space may be determined. During successive times, as the AMD 104 moves and additional images are acquired from locations in the physical space, the apparent change in position of the same feature across the additional images may be used to determine subsequent poses. In some implementations a pose may comprise information about six dimensions (6D), that of three orthogonal axes and corresponding rotations about those axes.

The SLAM module 754 may also use data from other sensors 718 such as motor encoders, inertial measurement units (IMU) 520 with one or more accelerometers and gyroscopes, and so forth. For example, inertial data indicative of rotations, accelerations along particular axes, and so forth obtained from the IMU may be integrated to provide information about the movement of the AMD 104.

A set of poses generated by the SLAM module 754 over time describe the trajectory. For example, trajectory data may comprise a time series of pose data from the SLAM module 754.

During operation, the mapping module 732 may use the SLAM module 754 to determine pose data. The pose data may comprise information indicative of pose. For example, the pose data may include information indicative of a location in the physical space and orientation of the AMD 104 relative to the physical space. The SLAM module 754 may use one or more of: the point cloud data 778, the image data 780, or data from other sensors 718. The pose data may be used by other modules. For example, the locations of objects may be determined based on the pose data. Continuing the example, based on the pose data specifying the location in the physical space and orientation of the AMD 104, the point cloud data 778 acquired may be associated with a particular location in the physical space.

While the AMD 104 is moving, other sensors 718 are acquiring information about the physical space. One or more depth sensors may acquire depth data about the presence or absence of objects in the physical space. For example, the depth sensors may comprise a time-of-flight (TOF) depth camera, ultrasound, radar, and so forth. The depth data provided by a depth sensor is indicative of whether an object is detected or not, and also includes information about the distance between the sensor 718 and the object and relative direction with respect to the sensor 718 and an object, if detected.

Depth sensors such as ultrasonic sensors, optical sensors such as a TOF depth camera, LIDAR, radar, and so forth may provide depth data that is indicative of the presence or absence of objects in the physical space within the FOV of the depth sensor. For example, a sensor 718 such as a TOF depth camera may emit a pulse of infrared light and use a detected return time for reflected light to determine a distance between the sensor and the object that reflected the light. The depth data may be expressed as point cloud data, volumetric data, bearing and distance data, and so forth. The depth data may be used to determine the occupancy map 784.

The AMD 104 may include one or more network interfaces 714. The network interfaces 714 may include devices to connect to personal area networks (PANS), local area networks (LANs), wireless local area networks (WLANS), wide area networks (WANs), and so forth. For example, the network interfaces 714 may include devices compatible with Ethernet, Wi-Fi, Bluetooth, Bluetooth Low Energy, ZigBee, and so forth.

The AMD 104 includes one or more memories 730. The memory 730 may comprise one or more non-transitory computer-readable storage media (CRSM).

The AMD 104 may include one or more sensors 718. For example, the sensors 718 may include microphones, a microphone array, time-of-flight (TOF) sensors, cameras, LIDAR, and so forth. The sensors 718 may generate sensor data 774. The sensors 718 are discussed in more detail with regard to FIG. 8.

During operation, the AMD 104 may determine input data 782. The input data 782 may include or be based at least in part on sensor data 774 from the sensors 718 onboard the AMD 104. In one implementation, a speech processing module 742 may process raw audio data 776 obtained by a microphone on the AMD 104 and produce input data 782. For example, the user may say "robot, come here" which may produce input data 782 "come here". In another implementation, the input data 782 may comprise information such as a command provided by another computing device, such as a smartphone or tablet computer.

The AMD 104 may utilize one or more task modules 752. The task module 752 comprises instructions that, when executed, provide one or more functions. The task modules 752 may perform functions such as finding a user, following a user, present output on output devices 720 of the AMD 104, perform sentry tasks by moving the AMD 104 through the physical space to determine the presence of unauthorized people, and so forth.

The AMD 104 includes one or more output devices 720, such as one or more of a motor 704, light, speaker, display, projector, printer, and so forth. One or more output devices 720 may be used to provide output during operation of the AMD 104. The output devices 720 are discussed in more detail with regard to FIG. 8.

One or more clocks 708 may provide information indicative of date, time, ticks, and so forth. For example, the processor 702 may use data from the clock 708 to associate a particular time with an action, sensor data 774, and so forth.

The AMD 104 may include one or more hardware processors 702 (processors) configured to execute one or more stored instructions. The processors 702 may comprise one or more cores. The processors 702 may include microcontrollers, systems on a chip, field programmable gate arrays, digital signal processors, graphic processing units, general processing units, and so forth.

The AMD 104 may include one or more communication interfaces 710 such as input/output (I/O) interfaces 712, network interfaces 714, and so forth. The communication interfaces 710 enable the AMD 104, or components thereof, to communicate with other devices or components. The communication interfaces 710 may include one or more I/O interfaces 712. The I/O interfaces 712 may comprise Inter-Integrated Circuit (I2C), Serial Peripheral Interface bus (SPI), Universal Serial Bus (USB) as promulgated by the USB Implementers Forum, RS-754, and so forth.

The I/O interface(s) 712 may couple to one or more I/O device 716. The I/O device 716 may include input devices such as one or more of a sensor 718, keyboard, mouse, scanner, and so forth. The I/O devices 716 may also include output devices 720 such as one or more of a motor 704, light, speaker, display, projector, printer, and so forth. In some embodiments, the I/O devices 716 may be physically incorporated with the AMD 104 or may be externally placed.

The network interfaces 714 may be configured to provide communications between the AMD 104 and other devices such as other AMDs 104, docking stations, routers, access points, and so forth. The network interfaces 714 may include devices configured to couple to personal area networks (PANS), local area networks (LANs), wireless local area networks (WLANS), wide area networks (WANs), and so forth. For example, the network interfaces 714 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 7, the AMD 104 includes one or more memories 730. The memory 730 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 730 provides storage of computer-readable instructions, data structures, program modules, and other data for the operation of the AMD 104. A few example functional modules are shown stored in the memory 730, although the same functionality may alternatively be implemented in hardware, firmware, or as a system on a chip (SoC).

The memory 730 may include at least one operating system (OS) module 734. The OS module 734 is configured to manage hardware resource devices such as the I/O interfaces 712, the I/O device 716, the communication interfaces 710, and provide various services to applications or modules executing on the processors 702. The OS module 734 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS), and so forth.

Also stored in the memory 730 may be a data store 770 and one or more of the following modules. These modules may be executed as foreground applications, background tasks, daemons, and so forth. The data store 770 may use a flat file, database, linked list, tree, executable code, script, or other data structure to store information. In some implementations, the data store 770 or a portion of the memory 730 may be distributed across one or more other devices including other AMDs 104, servers, network attached storage devices, and so forth.

A communication module 736 may be configured to establish communication with other devices, such as other AMDs 104, an external server, a docking station, and so forth. The communications may be authenticated, encrypted, and so forth.

Other modules within the memory 730 may include a safety module 738, the mapping module 732, the navigation map module 740, the autonomous navigation module 750, the one or more task modules 752, the speech processing module 742, or other modules 756. The modules may access memory within the data store 770, including safety tolerance data 772, sensor data 774, other data 790, and so forth.

The safety module 738 may access the safety tolerance data 772 to determine within what tolerances the AMD 104 may operate safely within the physical space. For example, the safety module 738 may be configured to stop the AMD 104 from moving when an extensible mast of the AMD 104 is extended. In another example, the safety tolerance data 772 may specify a minimum sound threshold which, when exceeded, stops all movement of the AMD 104. Continuing this example, detection of sound such as a human yell would stop the AMD 104. In another example, the safety module 738 may access safety tolerance data 772 that specifies a minimum distance from an object that the AMD 104 is to maintain. Continuing this example, when a sensor 718 detects an object has approached to less than or equal to the minimum distance, all movement of the AMD 104 may be stopped. Movement of the AMD 104 may be stopped by one or more of inhibiting operations of one or more of the motors 704, issuing a command to stop motor operation, disconnecting power from one or more the motors 704, and so forth. The safety module 738 may be implemented as hardware, software, or a combination thereof.

The safety module 738 may control other factors, such as a maximum speed of the AMD 104 based on information obtained by the sensors 718, precision and accuracy of the sensor data 774, and so forth. For example, detection of an object by an optical sensor may include some error, such as when the distance to an object comprises a weighted average between the object and a background. As a result, the maximum speed permitted by the safety module 738 may be based on one or more factors such as the weight of the AMD 104, nature of the floor, distance to the object, and so forth. In the event that the maximum permissible speed differs from the maximum speed permitted by the safety module 738, the lesser speed may be utilized.

The navigation map module 740 uses the occupancy map 784 as input to generate the navigation map 786. The navigation map module 740 may produce the navigation map 786 to inflate or enlarge the objects indicated by the occupancy map 784. One or more inflation parameters may be used during operation. The inflation parameters provide information such as inflation distance, inflation adjustment values, and so forth. In some implementations the inflation parameters may be based at least in part on the sensor FOV, sensor blind spot, physical dimensions of the AMD 104, and so forth.

The speech processing module 742 may be used to process utterances of the user. Microphones may acquire audio in the presence of the AMD 104 and may send raw audio data 776 to an acoustic front end (AFE). The AFE may transform the raw audio data 776 (for example, a single-channel, 16-bit audio stream sampled at 16 kHz), captured by the microphone, into audio feature vectors 744 that may ultimately be used for processing by various components, such as a wakeword detection module 746, speech recognition engine, or other components. The AFE may reduce noise in the raw audio data 776. The AFE may also perform acoustic echo cancellation (AEC) or other operations to account for output audio data that may be sent to a speaker of the AMD 104 for output. For example, the AMD 104 may be playing music or other audio that is being received from a network in the form of output audio data. To avoid the output audio interfering with the device's ability to detect and process input audio, the AFE or other component may perform echo cancellation to remove the output audio data from the input raw audio data 776, or other operations.

The AFE may divide the raw audio data 776 into frames representing time intervals for which the AFE determines a number of values (i.e., features) representing qualities of the raw audio data 776, along with a set of those values (i.e., a feature vector or audio feature vector 744) representing features/qualities of the raw audio data 776 within each frame. A frame may be a certain period of time, for example a sliding window of 25 ms of audio data 748 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 776, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 744 (or the raw audio data 776) may be input into a wakeword detection module 746 that is configured to detect keywords spoken in the audio. The wakeword detection module 746 may use various techniques to determine whether audio data 748 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 746 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 746 may compare audio data 748 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 748 (which may include one or more of the raw audio data 776 or the audio feature vectors 744) to one or more server(s) for speech processing. The audio data 748 corresponding to audio obtained by the microphone may be processed locally on one or more of the processors 702, sent to a server for routing to a recipient device or may be sent to the server for speech processing for interpretation of the included speech (either for purposes of enabling voice-communications and/or for purposes of executing a command in the speech). The audio data 748 may include data corresponding to the wakeword, or the portion of the audio data 748 corresponding to the wakeword may be removed by the AMD 104 before processing by the navigation map module 740, prior to sending to the server, and so forth.

The speech processing module 742 may include or access an automated speech recognition (ASR) module. The ASR module may accept as input raw audio data 776, audio feature vectors 744, or other sensor data 774 and so forth and may produce as output the input data 782 comprising a text string or other data representation. The input data 782 comprising the text string or other data representation may be processed by the navigation map module 740 to determine the command to be executed. For example, the utterance of the command "robot, come here" may result in input data 782 comprising the text string "come here". The wakeword "robot" may be omitted from the input data 782.

The mapping module 732 may use one or more simultaneous localization and mapping ("SLAM") techniques. The SLAM algorithms may utilize one or more of maps, algorithms, beacons, or other techniques to navigate. The autonomous navigation module 750 may use the navigation map 786 to determine a set of possible paths along which the AMD 104 may move. One of these may be selected and used to determine path plan data 788 indicative of a path. For example, a possible path that is the shortest or has the fewest turns may be selected and used to determine the path. The path is then subsequently used to determine a set of commands that drive the motors 704 connected to the wheels. For example, the autonomous navigation module 750 may determine the current location within the physical space and determine path plan data 788 that describes the path to a destination location such as the docking station.

The autonomous navigation module 750 may utilize various techniques during processing of sensor data 774. For example, image data 780 obtained from cameras on the AMD 104 may be processed to determine one or more of corners, edges, planes, and so forth. In some implementations, corners may be detected, and the coordinates of those corners may be used to produce point cloud data. This point cloud data may then be used for SLAM or other purposes associated with mapping, navigation, and so forth.

The AMD 104 may move responsive to a determination made by an onboard processor 702, in response to a command received from one or more communication interfaces 710, as determined from the sensor data 774, and so forth. For example, an external server may send a command that is received using the network interface 714. This command may direct the AMD 104 to proceed to find a particular user, follow a particular user, and so forth. The AMD 104 may then process this command and use the autonomous navigation module 750 to determine the directions and distances associated with carrying out the command. For example, the command to "come here" may result in the task module 752 sending a command to the autonomous navigation module 750 to move the AMD 104 to a particular location near the user and orient the AMD 104 in a particular direction.

The AMD 104 may connect to the network using one or more of the network interfaces 714. In some implementations, one or more of the modules or other functions described here may execute on the processors 702 of the AMD 104, on the server, or a combination thereof. For example, one or more servers may provide various functions, such as ASR, natural language understanding (NLU), providing content such as audio or video to the AMD 104, and so forth.

The other modules 756 may provide other functionality, such as object recognition, speech synthesis, user identification, and so forth. The other modules 756 may comprise a speech synthesis module that is able to convert text data to human speech. For example, the speech synthesis module may be used by the AMD 104 to provide speech that a user is able to understand.

The data store 770 may store the other data 790 as well. For example, localization settings may indicate local preferences such as language, user identifier data may be stored that allows for identification of a particular user, and so forth.

Figure 8:
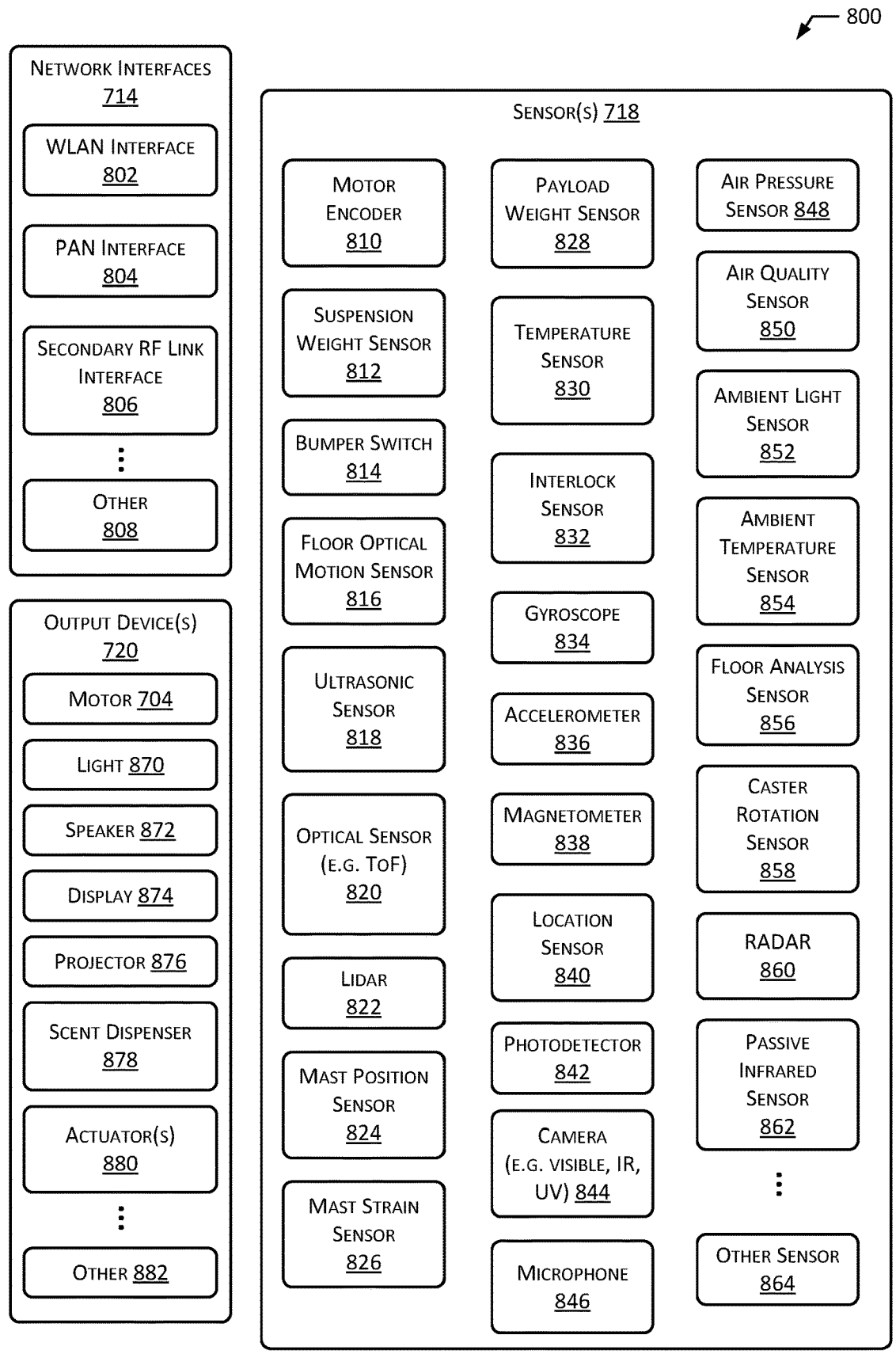
FIG. 8 illustrates a block diagram of some components of the AMD 104 such as network interfaces 714, sensors 718, and output devices 720, according to some implementations.

FIG. 8 illustrates a block diagram 800 of some components of the AMD 104 such as network interfaces 714, sensors 718, and output devices 720, according to some implementations. The components illustrated here are provided by way of illustration and not necessarily as a limitation. For example, the AMD 104 may utilize a subset of the particular network interfaces 714, output devices 720, or sensors 718 depicted here, or may utilize components not pictured. One or more of the sensors 718, output devices 720, or a combination thereof may be included on a moveable component that may be panned, tilted, rotated, or any combination thereof with respect to a chassis of the AMD 104.

The network interfaces 714 may include one or more of a WLAN interface 802, PAN interface 804, secondary radio frequency (RF) link interface 806, or other interface 808. The WLAN interface 802 may be compliant with at least a portion of the Wi-Fi specification. For example, the WLAN interface 802 may be compliant with at least a portion of the IEEE 802.11 specification as promulgated by the Institute of Electrical and Electronics Engineers (IEEE). The PAN interface 804 may be compliant with at least a portion of one or more of the Bluetooth, wireless USB, Z-Wave, ZigBee, or other standards. For example, the PAN interface 804 may be compliant with the Bluetooth Low Energy (BLE) specification.

The secondary RF link interface 806 may comprise a radio transmitter and receiver that operate at frequencies different from or using modulation different from the other interfaces. For example, the WLAN interface 802 may utilize frequencies in the 2.4 GHz and 5 GHz Industrial Scientific and Medicine (ISM) bands, while the PAN interface 804 may utilize the 2.4 GHz ISM bands. The secondary RF link interface 806 may comprise a radio transmitter that operates in the 900 MHz ISM band, within a licensed band at another frequency, and so forth. The secondary RF link interface 806 may be utilized to provide backup communication between the AMD 104 and other devices in the event that communication fails using one or more of the WLAN interface 802 or the PAN interface 804. For example, in the event the AMD 104 travels to an area within the physical space that does not have Wi-Fi coverage, the AMD 104 may use the secondary RF link interface 806 to communicate with another device such as a specialized access point, docking station, or other AMD 104.

The other 808 network interfaces may include other equipment to send or receive data using other wavelengths or phenomena. For example, the other 808 network interface may include an ultrasonic transceiver used to send data as ultrasonic sounds, a visible light system that communicates by modulating a visible light source such as a light-emitting diode, and so forth. In another example, the other 808 network interface may comprise a wireless wide area network (WWAN) interface or a wireless cellular data network interface. Continuing the example, the other 808 network interface may be compliant with at least a portion of the 4G, LTE, 5G, or other standards.

The AMD 104 may include one or more of the following sensors 718. The sensors 718 depicted here are provided by way of illustration and not necessarily as a limitation. It is understood that other sensors 718 may be included or utilized by the AMD 104, while some sensors 718 may be omitted in some configurations.

A motor encoder 810 provides information indicative of the rotation or linear extension of a motor 704. The motor 704 may comprise a rotary motor, or a linear actuator. In some implementations, the motor encoder 810 may comprise a separate assembly such as a photodiode and encoder wheel that is affixed to the motor 704. In other implementations, the motor encoder 810 may comprise circuitry configured to drive the motor 704. For example, the autonomous navigation module 750 may utilize the data from the motor encoder 810 to estimate a distance traveled.

A suspension weight sensor 812 provides information indicative of the weight of the AMD 104 on the suspension system for one or more of the wheels or the caster. For example, the suspension weight sensor 812 may comprise a switch, strain gauge, load cell, photodetector 842, or other sensing element that is used to determine whether weight is applied to a particular wheel, or whether weight has been removed from the wheel. In some implementations, the suspension weight sensor 812 may provide binary data such as a "1" value indicating that there is a weight applied to the wheel, while a "0" value indicates that there is no weight applied to the wheel. In other implementations, the suspension weight sensor 812 may provide an indication such as so many kilograms of force or newtons of force. The suspension weight sensor 812 may be affixed to one or more of the wheels or the caster. In some situations, the safety module 738 may use data from the suspension weight sensor 812 to determine whether or not to inhibit operation of one or more of the motors 704. For example, if the suspension weight sensor 812 indicates no weight on the suspension, the implication is that the AMD 104 is no longer resting on its wheels, and thus operation of the motors 704 may be inhibited. In another example, if the suspension weight sensor 812 indicates weight that exceeds a threshold value, the implication is that something heavy is resting on the AMD 104 and thus operation of the motors 704 may be inhibited. For example, the threshold value may comprise a weight of a load that compresses a suspension system to a minimum height, or results in a mass that exceeds a torque output of the motors 704 to maintain a minimum acceleration.

One or more bumper switches 814 provide an indication of physical contact between a bumper or other member that is in mechanical contact with the bumper switch 814. The safety module 738 utilizes sensor data 774 obtained by the bumper switches 814 to modify the operation of the AMD 104. For example, if the bumper switch 814 associated with a front of the AMD 104 is triggered, the safety module 738 may drive the AMD 104 backwards.

A floor optical motion sensor (FOMS) 816 provides information indicative of motion of the AMD 104 relative to the floor or other surface underneath the AMD 104. In one implementation, the FOMS 816 may comprise a light source such as light-emitting diode (LED), an array of photodiodes, and so forth. In some implementations, the FOMS 816 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 816 may provide other information, such as data indicative of a pattern present on the floor, composition of the floor, color of the floor, and so forth. For example, the FOMS 816 may utilize an optoelectronic sensor that may detect different colors or shades of gray, and this data may be used to generate floor characterization data. The floor characterization data may be used for navigation.

An ultrasonic sensor 818 utilizes sounds in excess of 20 kHz to determine a distance from the sensor 718 to an object. The ultrasonic sensor 818 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 818 may provide information indicative of a presence of an object, distance to the object, and so forth. Two or more ultrasonic sensors 818 may be utilized in conjunction with one another to determine a location within a two-dimensional plane of the object.

In some implementations, the ultrasonic sensor 818 or a portion thereof may be used to provide other functionality. For example, the emitter of the ultrasonic sensor 818 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 820 may provide sensor data 774 indicative of one or more of a presence or absence of an object, a distance to the object, or characteristics of the object. The optical sensor 820 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 820 may utilize one or more sensing elements. For example, the optical sensor 820 may comprise a 4x4 array of light sensing elements. Each individual sensing element may be associated with a field of view (FOV) that is directed in a different way. For example, the optical sensor 820 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 718 such as an image sensor or camera 844. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 820 may operate as a depth camera, providing a two-dimensional image of a scene, as well as data that indicates a distance to each pixel.

Data from the optical sensors 820 may be utilized for collision avoidance. For example, the safety module 738 and the autonomous navigation module 750 may utilize the sensor data 774 indicative of the distance to an object in order to prevent a collision with that object.

Multiple optical sensors 820 may be operated such that their FOV overlap at least partially. To minimize or eliminate interference, the optical sensors 320 may selectively control one or more of the timing, modulation, or frequency of the light emitted. For example, a first optical sensor 820 may emit light modulated at 30 kHz while a second optical sensor 820 emits light modulated at 33 kHz.

A lidar 822 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 774 may be generated that is indicative of the presence of objects and the relative positions, shapes, and so forth that are visible to the lidar 822. Data from the lidar 822 may be used by various modules. For example, the autonomous navigation module 750 may utilize point cloud data generated by the lidar 822 for localization of the AMD 104 within the physical space.

The AMD 104 may include a mast. A mast position sensor 824 provides information indicative of a position of the mast of the AMD 104. For example, the mast position sensor 824 may comprise limit switches associated with the mast extension mechanism that indicate whether the mast is at an extended or retracted position. In other implementations, the mast position sensor 824 may comprise an optical code on at least a portion of the mast that is then interrogated by an optical emitter and a photodetector 842 to determine the distance to which the mast is extended. In another implementation, the mast position sensor 824 may comprise an encoder wheel that is attached to a mast motor that is used to raise or lower the mast. The mast position sensor 824 may provide data to the safety module 738. For example, if the AMD 104 is preparing to move, data from the mast position sensor 824 may be checked to determine if the mast is retracted, and if not, the mast may be retracted prior to beginning movement.

A mast strain sensor 826 provides information indicative of a strain on the mast with respect to the remainder of the AMD 104. For example, the mast strain sensor 826 may comprise a strain gauge or load cell that measures a side-load applied to the mast or a weight on the mast or downward pressure on the mast. The safety module 738 may utilize sensor data 774 obtained by the mast strain sensor 826. For example, if the strain applied to the mast exceeds a threshold amount, the safety module 738 may direct an audible and visible alarm to be presented by the AMD 104.

The AMD 104 may include a modular payload bay. A payload weight sensor 328 provides information indicative of the weight associated with the modular payload bay. The payload weight sensor 828 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 828 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 828 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 738 may utilize the payload weight sensor 828 to determine if the modular payload bay has been overloaded. If so, an alert or notification may be issued.

One or more device temperature sensors 830 may be utilized by the AMD 104. The device temperature sensors 330 provide temperature data of one or more components within the AMD 104. For example, a device temperature sensor 830 may indicate a temperature of one or more the batteries 706, one or more motors 704, and so forth. In the event the temperature exceeds a threshold value, the component associated with that device temperature sensor 830 may be shut down. For example, the threshold value may be determined based on component specifications, such as a maximum permissible temperature of the batteries 706.

One or more interlock sensors 832 may provide data to the safety module 738 or other circuitry that prevents the AMD 104 from operating in an unsafe condition. For example, the interlock sensors 832 may comprise switches that indicate whether an access panel is open. The interlock sensors 832 may be configured to inhibit operation of the AMD 104 until the interlock switch indicates a safe condition is present.

A gyroscope 834 may provide information indicative of rotation of an object affixed thereto. For example, a gyroscope 834 may generate sensor data 774 that is indicative of a change in orientation of the AMD 104 or a portion thereof.

An accelerometer 836 provides information indicative of a direction and magnitude of an imposed acceleration. Data such as rate of change, determination of changes in direction, speed, and so forth may be determined using the accelerometer 336. The accelerometer 836 may comprise mechanical, optical, micro-electromechanical, or other devices. For example, the gyroscope 834 in the accelerometer 836 may comprise a prepackaged solid-state inertial measurement unit (IMU) that provides multiple axis gyroscopes 834 and accelerometers 836.

A magnetometer 838 may be used to determine an orientation by measuring ambient magnetic fields, such as the terrestrial magnetic field. For example, the magnetometer 838 may comprise a Hall effect transistor that provides output compass data indicative of a magnetic heading.

The AMD 104 may include one or more location sensors 840. The location sensors 840 may comprise an optical, radio, or other navigational system such as a global positioning system (GPS) receiver. For indoor operation, the location sensors 840 may comprise indoor position systems, such as using Wi-Fi Positioning Systems (WPS). The location sensors 840 may provide information indicative of a relative location, such as "living room" or an absolute location such as particular coordinates indicative of latitude and longitude, or displacement with respect to a predefined origin.

A photodetector 842 provides sensor data 774 indicative of impinging light. For example, the photodetector 842 may provide data indicative of a color, intensity, duration, and so forth.

A camera 844 generates sensor data 774 indicative of one or more images. The camera 844 may be configured to detect light in one or more wavelengths including, but not limited to, terahertz, infrared, visible, ultraviolet, and so forth. For example, an infrared camera 844 may be sensitive to wavelengths between approximately 700 nanometers and 1 millimeter. The camera 844 may comprise charge coupled devices (CCD), complementary metal oxide semiconductor (CMOS) devices, microbolometers, and so forth. The AMD 104 may use image data acquired by the camera 844 for object recognition, navigation, collision avoidance, user communication, and so forth. For example, a pair of cameras 844 sensitive to infrared light may be mounted on the front of the AMD 104 to provide binocular stereo vision, with the sensor data 774 comprising images being sent to the autonomous navigation module 750. In another example, the camera 844 may comprise a 10 megapixel or greater camera that is used for videoconferencing or for acquiring pictures for the user.

The camera 844 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 844, particularly those associated with navigation or autonomous operation, may utilize a global shutter. In other implementations, the camera(s) 844 providing images for use by the autonomous navigation module 750 may be acquired using a rolling shutter and subsequently may be processed to mitigate image artifacts.

One or more microphones 346 may be configured to acquire information indicative of sound present in the physical space. In some implementations, arrays of microphones 846 may be used. These arrays may implement beamforming techniques to provide for directionality of gain. The AMD 104 may use the one or more microphones 846 to acquire information from acoustic tags, accept voice input from users, determine a direction of an utterance, determine ambient noise levels, for voice communication with another user or system, and so forth.

An air pressure sensor 848 may provide information indicative of an ambient atmospheric pressure or changes in ambient atmospheric pressure. For example, the air pressure sensor 848 may provide information indicative of changes in air pressure due to opening and closing of doors, weather events, and so forth.

An air quality sensor 850 may provide information indicative of one or more attributes of the ambient atmosphere. For example, the air quality sensor 850 may include one or more chemical sensing elements to detect the presence of carbon monoxide, carbon dioxide, ozone, and so forth. In another example, the air quality sensor 850 may comprise one or more elements to detect particulate matter in the air, such as the photoelectric detector, ionization chamber, and so forth. In another example, the air quality sensor 850 may include a hygrometer that provides information indicative of relative humidity.

An ambient light sensor 852 may comprise one or more photodetectors 842 or other light-sensitive elements that are used to determine one or more of the color, intensity, or duration of ambient lighting around the AMD 104.

An ambient temperature sensor 854 provides information indicative of the temperature of the ambient physical space proximate to the AMD 104. In some implementations, an infrared temperature sensor may be utilized to determine the temperature of another object at a distance.

A floor analysis sensor 856 may include one or more components that are used to generate at least a portion of floor characterization data. In one implementation, the floor analysis sensor 856 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 856 may be used by one or more of the safety module 738, the autonomous navigation module 750, the task module 752, and so forth. For example, if the floor analysis sensor 856 determines that the floor is wet, the safety module 738 may decrease the speed of the AMD 104 and generate a notification alerting the user.

The floor analysis sensor 856 may include other components as well. For example, a coefficient of friction sensor may comprise a probe that comes into contact with the surface and determines the coefficient of friction between the probe and the floor.

A caster rotation sensor 858 provides data indicative of one or more of a direction of orientation, angular velocity, linear speed of the caster, and so forth. For example, the caster rotation sensor 858 may comprise an optical encoder and corresponding target that is able to determine that the caster transitioned from an angle of 0° at a first time to 49° at a second time.

The sensors 718 may include a radar 860. The radar 860 may be used to provide information as to a distance, lateral position, and so forth, to an object.

The sensors 718 may include a passive infrared (PIR) sensor 862. The PIR 862 sensor may be used to detect the presence of users, pets, hotspots, and so forth. For example, the PIR sensor 862 may be configured to detect infrared radiation with wavelengths between 8 and 14 micrometers.

The AMD 104 may include other sensors 864 as well. For example, a capacitive proximity sensor may be used to provide proximity data to adjacent objects. Other sensors 864 may include radio frequency identification (RFID) readers, near field communication (NFC) systems, coded aperture cameras, and so forth. For example, NFC tags may be placed at various points within the physical space to provide landmarks for the autonomous navigation module 750. One or more touch sensors may be utilized to determine contact with a user or other objects.

The AMD 104 may include one or more output devices 720. A motor 704 may be used to provide linear or rotary motion. A light 870 may be used to emit photons. A speaker 872 may be used to emit sound. A display 874 may comprise one or more of a liquid crystal display, light emitting diode display, electrophoretic display, cholesteric liquid crystal display, interferometric display, and so forth. The display 874 may be used to present visible information such as graphics, pictures, text, and so forth. In some implementations, the display 874 may comprise a touchscreen that combines a touch sensor and a display 874.

In some implementations, the AMD 104 may be equipped with a projector 876. The projector 876 may be able to project an image on a surface, such as the floor, wall, ceiling, and so forth.

A scent dispenser 878 may be used to emit one or more smells. For example, the scent dispenser 878 may comprise a plurality of different scented liquids that may be evaporated or vaporized in a controlled fashion to release predetermined amounts of each.

One or more moveable component actuators 880 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 880 to produce movement of the moveable component.

In other implementations, other 882 output devices may be utilized. For example, the AMD 104 may include a haptic output device that provides output that produces particular touch sensations to the user. Continuing the example, a motor 704 with an eccentric weight may be used to create a buzz or vibration to allow the AMD 104 to simulate the purr of a cat.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
   a chassis comprising a chassis ground;
   a plurality of wheel assemblies, wherein the plurality of wheel assemblies comprises a first wheel assembly that is:
   electrically conductive, and
   electrically connected to the chassis ground;
   an electrostatic dissipation structure that is electrically connected to the first wheel assembly;
   a first structure comprising a first side and a second side, wherein the first side is affixed to the chassis;
   a second structure comprising a third side and a fourth side;
   one or more elastomeric components that join the second side of the first structure to the third side of the second structure;
   a first image sensor mounted on the fourth side of the second structure;
   a second image sensor mounted on the fourth side and at a first distance from the first image sensor;
   one or more sensors that are electrically connected to the chassis ground; and
   one or more processors that are electrically connected to the chassis ground.

2. The AMD of claim 1,
   wherein the first wheel assembly comprises:
   a conductive wheel assembly,
   a conductive axle, and
   a conductive mounting structure that mounts the first wheel assembly to a supporting structure of the AMD; and
   wherein the conductive wheel assembly, the conductive axle, and the conductive mounting structure are electrically connected to the chassis ground.

3. The AMD of claim 1, wherein:
   the plurality of wheel assemblies comprises a second wheel assembly that is electrically conductive; and
   the second wheel assembly is electrically connected to the first wheel assembly.

4. The AMD of claim 1, wherein the electrostatic dissipation structure is mounted on an aft portion of the chassis, and wherein the electrostatic dissipation structure comprises a plurality of electrically conductive strands that are exposed to an ambient environment.

5. The AMD of claim 1, wherein the electrostatic dissipation structure comprises a static wick.

6. The AMD of claim 1, wherein a conductive path between the chassis ground and the electrostatic dissipation structure comprises one or more resistors having a total resistance of at least 10,000 ohms.

7. The AMD of claim 1, further comprising:
   an inertial measurement unit mounted to the second structure.

8. The AMD of claim 1, wherein the first structure further comprises:
   an engagement feature extending through a hole in the second structure, wherein the engagement feature comprises a fastener that retains the second structure on the engagement feature.

9. The AMD of claim 1, wherein the one or more elastomeric components have an ohmic resistance between 1E5 and 1E13 ohms.

10. An apparatus comprising:
    a first wheel assembly that is:
    electrically conductive, and
    electrically connected to a ground;
    an electrostatic dissipation structure that is electrically connected to the first wheel assembly;
    a first structure comprising a first side and a second side;
    a second structure comprising a third side and a fourth side;
    one or more elastomeric components that join the second side of the first structure to the third side of the second structure;
    a first sensor mounted on the fourth side of the second structure;
    a second sensor mounted on the fourth side of the second structure;
    one or more sensors that are electrically connected to the ground; and
    one or more processors that are electrically connected to the ground.

11. The apparatus of claim 10,
    wherein the first wheel assembly comprises:
    a conductive wheel assembly,
    a conductive axle, and
    a conductive mounting structure that mounts the first wheel assembly to a supporting structure of the apparatus; and
    wherein the conductive wheel assembly, the conductive axle, and the conductive mounting structure are electrically connected to the ground.

12. The apparatus of claim 10, further comprising a second wheel assembly that is electrically conductive, and wherein the second wheel assembly is electrically connected to the first wheel assembly.

13. The apparatus of claim 10, wherein the electrostatic dissipation structure is mounted on an aft portion of the apparatus, and wherein the electrostatic dissipation structure comprises a plurality of electrically conductive strands that are exposed to an ambient environment.

14. The apparatus of claim 10, wherein a conductive path between the ground and the electrostatic dissipation structure comprises one or more resistors having a total resistance of at least 10,000 ohms.

15. The apparatus of claim 10, further comprising:
an inertial measurement unit mounted to the second structure.

16. The apparatus of claim 10, wherein the first structure further comprises:
an engagement feature extending through a hole in the second structure, wherein the engagement feature comprises a fastener that retains the second structure on the engagement feature.

17. A system comprising:
a ground;
at least one wheel assembly that provides an electrically conductive path between the ground and a surface upon which the system is resting;
an electrostatic dissipation structure that is electrically connected to the ground;
one or more sensors that are electrically connected to the ground;
one or more processors that are electrically connected to the ground;
a support structure that is electrically conductive and is electrically connected to the ground;
a sensor assembly mounted to the support structure, wherein the sensor assembly is electrically conductive and is electrically connected to the support structure, and wherein the sensor assembly comprises a time-of-flight sensor; and
a cover associated with the time-of-flight sensor, the cover comprising:
a first area that is transmissive to a first wavelength of light,
a second area that is transmissive to the first wavelength of light,
a third area that is transmissive to the first wavelength of light, and
a fourth area that is opaque to the first wavelength of light.

18. The system of claim 17, wherein, with respect to the second area, the first area is symmetrically opposite the third area.

19. The system of claim 17, further comprising:
a conductive material between the support structure and the sensor assembly, wherein the conductive material comprises one of a conductive plastic or a conductive metal.

20. The system of claim 17, further comprising:
one or more engagement features for mounting the sensor assembly to the support structure.

* * * * *